US012458606B2

(12) United States Patent
Duong et al.

(10) Patent No.: US 12,458,606 B2
(45) Date of Patent: Nov. 4, 2025

(54) POLYMER NANOPARTICLE COMPOSITIONS FOR IN VIVO EXPRESSION OF POLYPEPTIDES

(71) Applicant: BATTELLE MEMORIAL INSTITUTE, Columbus, OH (US)

(72) Inventors: Anthony D. Duong, Columbus, OH (US); Kenneth R. Sims, Jr., Delaware, OH (US); Cherry Gupta, Columbus, OH (US); Danielle J. Huk, Hilliard, OH (US); Michael Riedl, Columbus, OH (US); Andrea D. McCue, Columbus, OH (US); Michael Wagner, Columbus, OH (US); Julianne N.P. Smith, Columbus, OH (US); Jacqueline Grible, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/902,113

(22) Filed: Sep. 30, 2024

(65) Prior Publication Data
US 2025/0108013 A1     Apr. 3, 2025

Related U.S. Application Data

(60) Provisional application No. 63/586,849, filed on Sep. 29, 2023.

(51) Int. Cl.
| A61K 9/51 | (2006.01) |
| A61K 47/54 | (2017.01) |
| A61K 47/69 | (2017.01) |
| C08F 299/02 | (2006.01) |

(52) U.S. Cl.
CPC .......... *A61K 9/5138* (2013.01); *A61K 47/549* (2017.08); *A61K 47/6933* (2017.08); *C08F 299/024* (2013.01)

(58) Field of Classification Search
CPC .................. A61K 47/6933; A61K 9/5138
See application file for complete search history.

(56) References Cited

U.S. PATENT DOCUMENTS

| 3,562,806 A | 2/1971 | Grant et al. |
| 3,678,098 A | 7/1972 | Lewis et al. |
| 3,691,123 A | 9/1972 | Clarke et al. |
| 3,706,564 A | 12/1972 | Perry et al. |
| 3,706,565 A | 12/1972 | Harris |
| 3,739,042 A | 6/1973 | Chu et al. |
| 3,744,969 A | 7/1973 | Alps et al. |
| 3,829,564 A | 8/1974 | Merry et al. |
| 3,847,857 A | 11/1974 | Haag et al. |
| 4,036,766 A | 7/1977 | Yamamoto et al. |
| 4,056,559 A | 11/1977 | Lewis et al. |
| 4,219,616 A | 8/1980 | Pope et al. |
| 4,237,253 A | 12/1980 | Jacquet et al. |
| 4,377,481 A | 3/1983 | Jakabhazy |
| 4,434,268 A | 2/1984 | Doroszkowsky et al. |
| 4,544,621 A | 10/1985 | Roth |
| 4,557,997 A | 12/1985 | Iwasaki et al. |
| 4,559,293 A | 12/1985 | Moriya et al. |
| 4,592,816 A | 6/1986 | Emmons et al. |
| 4,595,722 A | 6/1986 | Such |
| 4,656,027 A | 4/1987 | Sjoovist |
| 4,735,887 A | 4/1988 | Foss et al. |
| 4,755,563 A | 7/1988 | West |
| 4,775,721 A | 10/1988 | Horikawa et al. |
| 4,834,799 A | 5/1989 | Song |
| 4,855,207 A | 8/1989 | Tsubuko et al. |
| 4,925,764 A | 5/1990 | Madeleine et al. |
| 4,985,160 A | 1/1991 | Henry et al. |
| 5,085,698 A | 2/1992 | Ma et al. |
| 5,124,381 A | 6/1992 | Ward |
| 5,141,556 A | 8/1992 | Matrick |
| 5,180,425 A | 1/1993 | Matrick et al. |
| 5,205,861 A | 4/1993 | Matrick |
| 5,271,765 A | 12/1993 | Ma |
| 5,310,595 A | 5/1994 | Ali et al. |
| 5,310,778 A | 5/1994 | Shor et al. |
| 5,418,277 A | 5/1995 | Ma et al. |
| 5,428,383 A | 6/1995 | Shields et al. |
| 5,432,035 A | 7/1995 | Katagiri et al. |
| 5,512,418 A | 4/1996 | Ma |
| 5,518,534 A | 5/1996 | Pearlstine et al. |
| 5,519,081 A | 5/1996 | Ashton et al. |
| 5,519,085 A | 5/1996 | Ma et al. |
| 5,525,450 A | 6/1996 | Spiewak et al. |
| 5,620,883 A | 4/1997 | Shao et al. |

(Continued)

FOREIGN PATENT DOCUMENTS

| CN | 1323840 A | 11/2001 |
| CN | 1328106 A | 12/2001 |

(Continued)

OTHER PUBLICATIONS

International Search Report and Written Opinion issued in App. No. PCT/US2024/048964 mailed Jan. 7, 2025, 13 pages.
Cristillo, DNA with Talabostat, Biochem. Biophy. Res. Com. pp. 22-26 (Year: 2008).
Anonymous, "The Protein Man's Blog | A Discussion of Protein Research—High Efficiency & Stability Protein CrossLinking with EDC & NHS", G-Biosciences, (Sep. 26, 2017), G-Biosciences, URL: https://info.gbiosciences.com/blog/2-step-protein-coupling-edc-nhs, (Jan. 9, 2024), XP093117356.
GenBank ON170268, Ralsonia phage Y0160_4, 2022, 1-9. Obtained online at: https// www.genome.jpdbget-binwww_bgetgenbank-phgON170268 on Nov. 11, 2024. (Year: 2022).
Geneimprint; *Homo sapiens* KCNK9; 2007, 1-20. Obtained online at: tpswww.geneimprint.comsitegenesHomo_sapiens_KCNK9on (Year: 2007).

(Continued)

*Primary Examiner* — James W Rogers
(74) *Attorney, Agent, or Firm* — Barnes & Thornburg

(57) ABSTRACT

The disclosure relates to block copolymer nanoparticles for in vivo therapeutic delivery, and methods therefor. More particularly, the invention relates to polymer nanoparticles, such as reversible addition-fragmentation chain transfer (RAFT) polymer compositions, for delivering nucleotides that encode polypeptides.

8 Claims, 1 Drawing Sheet

(56) References Cited

U.S. PATENT DOCUMENTS

| | | |
|---|---|---|
| 5,698,016 A | 12/1997 | Adams et al. |
| 5,709,714 A | 1/1998 | Natoli et al. |
| 5,750,594 A | 5/1998 | Page et al. |
| 5,969,046 A | 10/1999 | Schindler et al. |
| 5,985,573 A | 11/1999 | Hennink et al. |
| 6,004,582 A | 12/1999 | Faour et al. |
| 6,004,712 A | 12/1999 | Barbetta et al. |
| 6,022,533 A | 2/2000 | Goto et al. |
| 6,022,908 A | 2/2000 | Ma et al. |
| 6,040,358 A | 3/2000 | Page et al. |
| 6,077,635 A | 6/2000 | Okado et al. |
| 6,132,917 A | 10/2000 | Hoffend et al. |
| 6,139,856 A | 10/2000 | Kaminska et al. |
| 6,197,290 B1 | 3/2001 | Goto et al. |
| 6,207,631 B1 | 3/2001 | Kasturi et al. |
| 6,221,402 B1 | 4/2001 | Itoh et al. |
| 6,245,421 B1 | 6/2001 | Aurenty et al. |
| 6,247,808 B1 | 6/2001 | Ma et al. |
| 6,251,554 B1 | 6/2001 | Hoffend et al. |
| 6,276,273 B1 | 8/2001 | Aurenty et al. |
| 6,309,666 B1 | 10/2001 | Hatano et al. |
| 6,315,854 B1 | 11/2001 | Anhauser et al. |
| 6,372,708 B1 | 4/2002 | Kasturi et al. |
| 6,413,306 B1 | 7/2002 | Kraiter et al. |
| 6,471,349 B1 | 10/2002 | Aurenty et al. |
| 6,532,871 B1 | 3/2003 | Aurenty et al. |
| 6,624,210 B1 | 9/2003 | Petereit et al. |
| 6,692,769 B1 | 2/2004 | Ishibashi et al. |
| 6,720,387 B1 | 4/2004 | Stark et al. |
| 6,794,367 B1 | 9/2004 | Tanida et al. |
| 6,827,795 B1 | 12/2004 | Kasturi et al. |
| 6,903,064 B1 | 6/2005 | Kasturi et al. |
| 7,256,020 B2 | 8/2007 | Lyamichev et al. |
| 7,737,108 B1 | 6/2010 | Hoffman et al. |
| 8,501,923 B2 | 8/2013 | Rothemund |
| 8,758,860 B1 | 6/2014 | Pyles et al. |
| 9,085,618 B2 | 7/2015 | Ramasubramanyan et al. |
| 9,447,220 B2 | 9/2016 | Cho et al. |
| 9,714,940 B2 | 7/2017 | Lowery, Jr. et al. |
| 9,970,040 B2 | 5/2018 | Elbaz et al. |
| 10,201,503 B1 | 2/2019 | Li et al. |
| 10,695,443 B2 | 6/2020 | Lötvall et al. |
| 11,419,932 B2 | 8/2022 | Bathe et al. |
| 2002/0028410 A1 | 3/2002 | Choi |
| 2002/0187311 A1 | 12/2002 | Golub et al. |
| 2003/0049311 A1 | 3/2003 | McAllister et al. |
| 2003/0064036 A1 | 4/2003 | Petereit et al. |
| 2003/0071883 A1 | 4/2003 | Suzuki et al. |
| 2003/0106160 A1 | 6/2003 | Sun et al. |
| 2003/0124074 A1 | 7/2003 | Mougin et al. |
| 2003/0130160 A1 | 7/2003 | Eason et al. |
| 2003/0152856 A1 | 8/2003 | Mizoe et al. |
| 2003/0199419 A1 | 10/2003 | Rodrigues et al. |
| 2004/0091538 A1 | 5/2004 | Pollock-Dove et al. |
| 2004/0096490 A1 | 5/2004 | Bracht et al. |
| 2004/0104501 A1 | 6/2004 | Petereit et al. |
| 2004/0109869 A1 | 6/2004 | Glenn et al. |
| 2004/0198838 A1 | 10/2004 | Alles et al. |
| 2004/0208925 A1 | 10/2004 | Oner et al. |
| 2004/0219211 A1 | 11/2004 | Criere et al. |
| 2004/0249035 A1 | 12/2004 | Petereit et al. |
| 2005/0020779 A1 | 1/2005 | Mougin et al. |
| 2005/0026803 A1 | 2/2005 | Sivik et al. |
| 2005/0048112 A1 | 3/2005 | Breitenbach et al. |
| 2005/0053566 A1 | 3/2005 | Nguyen-Kim et al. |
| 2005/0070486 A1 | 3/2005 | Wieland-Berghausen et al. |
| 2005/0084529 A1 | 4/2005 | Rosenberg et al. |
| 2005/0090599 A1 | 4/2005 | Spinelli |
| 2005/0208133 A1 | 9/2005 | Tsutsumi et al. |
| 2005/0281871 A1 | 12/2005 | Petereit et al. |
| 2006/0051412 A1 | 3/2006 | Petereit et al. |
| 2006/0089425 A1 | 4/2006 | Chopra et al. |
| 2006/0110433 A1 | 5/2006 | Terahara et al. |
| 2006/0257484 A1 | 11/2006 | Hwang et al. |
| 2006/0280798 A1 | 12/2006 | Ensoli |
| 2007/0027213 A1 | 2/2007 | Oberegger et al. |
| 2007/0072996 A1 | 3/2007 | Kedar et al. |
| 2007/0088118 A1 | 4/2007 | Dungworth et al. |
| 2007/0141013 A1 | 6/2007 | Nguyen-Kim et al. |
| 2007/0178059 A1 | 8/2007 | Moser et al. |
| 2007/0203245 A1 | 8/2007 | Koltun et al. |
| 2007/0231397 A1 | 10/2007 | Petereit et al. |
| 2007/0259028 A1 | 11/2007 | Ito |
| 2007/0275060 A1 | 11/2007 | Befumo et al. |
| 2007/0275071 A1 | 11/2007 | Ensoli et al. |
| 2008/0050432 A1 | 2/2008 | Jun et al. |
| 2008/0050450 A1 | 2/2008 | Arnold et al. |
| 2008/0075689 A1 | 3/2008 | Pierobon et al. |
| 2008/0089853 A1 | 4/2008 | Nguyen-Kim et al. |
| 2008/0153982 A1 | 6/2008 | Lai et al. |
| 2008/0181948 A1 | 7/2008 | Berndl et al. |
| 2008/0193405 A1 | 8/2008 | Mukherjee et al. |
| 2008/0193544 A1 | 8/2008 | Bruck-Scheffler et al. |
| 2008/0226731 A1 | 9/2008 | Vasanthavada et al. |
| 2008/0233177 A1 | 9/2008 | Meconi |
| 2008/0280999 A1 | 11/2008 | Lakshman |
| 2008/0286221 A1 | 11/2008 | Kim et al. |
| 2008/0299391 A1 | 12/2008 | White et al. |
| 2008/0306233 A1 | 12/2008 | Muhrer et al. |
| 2009/0023754 A1 | 1/2009 | Lee et al. |
| 2009/0053315 A1 | 2/2009 | Brough et al. |
| 2009/0099075 A1 | 4/2009 | Barg et al. |
| 2009/0108241 A1 | 4/2009 | Ogura et al. |
| 2009/0118399 A1 | 5/2009 | Benbakoura et al. |
| 2009/0148522 A1 | 6/2009 | Kowalski et al. |
| 2009/0161058 A1 | 6/2009 | Sherman |
| 2009/0175952 A1 | 7/2009 | Woo et al. |
| 2009/0220596 A1 | 9/2009 | Rosenberg et al. |
| 2009/0221621 A1 | 9/2009 | Sathyan et al. |
| 2009/0280183 A1 | 11/2009 | Lizio et al. |
| 2009/0285891 A1 | 11/2009 | Jung et al. |
| 2009/0302493 A1 | 12/2009 | Kessler et al. |
| 2009/0311320 A1 | 12/2009 | Oury et al. |
| 2009/0318847 A1 | 12/2009 | Sebree et al. |
| 2009/0321945 A1 | 12/2009 | Besling |
| 2010/0038816 A1 | 2/2010 | Ghogh et al. |
| 2010/0048737 A1 | 2/2010 | Wendel et al. |
| 2010/0074951 A1 | 3/2010 | Kim et al. |
| 2010/0087544 A1 | 4/2010 | Kim et al. |
| 2010/0120970 A1 | 5/2010 | Biggs et al. |
| 2010/0143459 A1 | 6/2010 | Liepold et al. |
| 2010/0143470 A1 | 6/2010 | Kim et al. |
| 2010/0143590 A1 | 6/2010 | Held et al. |
| 2010/0152299 A1 | 6/2010 | Vasanthavada et al. |
| 2010/0160183 A1 | 6/2010 | Xu et al. |
| 2010/0174040 A1 | 7/2010 | Kim et al. |
| 2010/0209480 A1 | 8/2010 | Altenburger et al. |
| 2010/0209520 A1 | 8/2010 | Kubo |
| 2010/0233350 A1 | 9/2010 | Herrmann |
| 2010/0233447 A1 | 9/2010 | Campbell |
| 2010/0247635 A1 | 9/2010 | Rosenberg et al. |
| 2010/0266859 A1 | 10/2010 | Abe et al. |
| 2010/0272797 A1 | 10/2010 | Kim et al. |
| 2010/0278899 A1 | 11/2010 | Sugiura et al. |
| 2010/0286288 A1 | 11/2010 | Langguth et al. |
| 2010/0291311 A1 | 11/2010 | Trouve et al. |
| 2010/0310644 A1 | 12/2010 | Liebmann et al. |
| 2010/0323090 A1 | 12/2010 | Ishizaki et al. |
| 2011/0002988 A1 | 1/2011 | Ishizaki et al. |
| 2011/0005773 A1 | 1/2011 | Dusterhoft et al. |
| 2011/0032303 A1 | 2/2011 | Li |
| 2011/0052683 A1 | 3/2011 | Kim et al. |
| 2011/0052699 A1 | 3/2011 | Funke et al. |
| 2011/0091563 A1 | 4/2011 | Kurasawa et al. |
| 2011/0111021 A1 | 5/2011 | Kim et al. |
| 2011/0111022 A1 | 5/2011 | Kim et al. |
| 2011/0117194 A1 | 5/2011 | Kim et al. |
| 2011/0123636 A1 | 5/2011 | Stayton et al. |
| 2011/0143435 A1 | 6/2011 | Stayton |
| 2011/0144260 A1 | 6/2011 | Tanabe et al. |
| 2011/0201759 A1 | 8/2011 | Takahashi |
| 2011/0242154 A1 | 10/2011 | Roberts et al. |
| 2011/0257289 A1 | 10/2011 | Biggs et al. |
| 2011/0263470 A1 | 10/2011 | Qin et al. |

(56) References Cited

U.S. PATENT DOCUMENTS

| | | |
|---|---|---|
| 2011/0269913 A1 | 11/2011 | Balk et al. |
| 2011/0274893 A1 | 11/2011 | Kaser et al. |
| 2011/0275775 A1 | 11/2011 | Goto et al. |
| 2011/0287100 A1 | 11/2011 | Desset-Brethes et al. |
| 2011/0305660 A1 | 12/2011 | Stayton et al. |
| 2011/0306632 A1 | 12/2011 | Miller et al. |
| 2011/0312973 A1 | 12/2011 | Liepold et al. |
| 2012/0009223 A1 | 1/2012 | Wenguang et al. |
| 2012/0053248 A1 | 3/2012 | Kolter et al. |
| 2012/0093982 A1 | 4/2012 | Tsukioka et al. |
| 2012/0143039 A1 | 6/2012 | Hartwig et al. |
| 2012/0172574 A1 | 7/2012 | Helou et al. |
| 2012/0183769 A1 | 7/2012 | Nasu et al. |
| 2012/0190724 A1 | 7/2012 | Na et al. |
| 2012/0213827 A1 | 8/2012 | Chatterji et al. |
| 2012/0220550 A1 | 8/2012 | Bae et al. |
| 2012/0232117 A1 | 9/2012 | Bae et al. |
| 2012/0251583 A1 | 10/2012 | Rothemund |
| 2012/0258909 A1 | 10/2012 | Liepold et al. |
| 2012/0282303 A1 | 11/2012 | Ito |
| 2012/0282310 A1 | 11/2012 | Lucet-Levannier et al. |
| 2012/0283670 A1 | 11/2012 | Ito |
| 2012/0323190 A1 | 12/2012 | Ito |
| 2012/0328891 A1 | 12/2012 | Suwa et al. |
| 2013/0005874 A1 | 1/2013 | Nakajima et al. |
| 2013/0011362 A1 | 1/2013 | Monahan et al. |
| 2013/0017245 A1 | 1/2013 | Takano |
| 2013/0034599 A1 | 2/2013 | Thaxton et al. |
| 2013/0040236 A1 | 2/2013 | Fukushima et al. |
| 2013/0085233 A1 | 4/2013 | Niitani et al. |
| 2013/0090480 A1 | 4/2013 | Park Choo et al. |
| 2013/0095168 A1 | 4/2013 | Choi et al. |
| 2013/0129869 A1 | 5/2013 | Hafezi et al. |
| 2013/0171646 A1 | 7/2013 | Park et al. |
| 2013/0172239 A1 | 7/2013 | Gao et al. |
| 2013/0224859 A1 | 8/2013 | Bachelet et al. |
| 2013/0236551 A1 | 9/2013 | Cavazza |
| 2013/0239339 A1 | 9/2013 | Bown et al. |
| 2013/0243873 A1 | 9/2013 | Aversa et al. |
| 2013/0261019 A1 | 10/2013 | Lin et al. |
| 2013/0274297 A1 | 10/2013 | Gatti et al. |
| 2013/0317096 A1 | 11/2013 | Yap et al. |
| 2014/0018404 A1 | 1/2014 | Chen et al. |
| 2014/0080868 A1 | 3/2014 | Ng et al. |
| 2014/0080869 A1 | 3/2014 | Krishnan et al. |
| 2014/0080886 A1 | 3/2014 | Pilot-Matias et al. |
| 2014/0088152 A1 | 3/2014 | Bae et al. |
| 2014/0128418 A1 | 5/2014 | Bae et al. |
| 2014/0128827 A1 | 5/2014 | Song |
| 2014/0155388 A1 | 6/2014 | Brzeczko et al. |
| 2014/0161893 A1 | 6/2014 | Shen et al. |
| 2014/0206742 A1 | 7/2014 | Lomuscio et al. |
| 2014/0235790 A1 | 8/2014 | Stayton et al. |
| 2014/0248350 A1 | 9/2014 | Reyes et al. |
| 2014/0271857 A1 | 9/2014 | Nelson et al. |
| 2014/0303334 A1 | 10/2014 | Goto et al. |
| 2015/0045353 A1 | 2/2015 | Comer et al. |
| 2015/0086624 A1 | 3/2015 | Cho et al. |
| 2015/0104408 A1 | 4/2015 | Wakefield et al. |
| 2015/0118294 A1 | 4/2015 | Song et al. |
| 2015/0132479 A1 | 5/2015 | Arfsten et al. |
| 2015/0164816 A1 | 6/2015 | Jaklenec et al. |
| 2015/0174250 A1 | 6/2015 | Griffiths et al. |
| 2015/0191132 A1 | 7/2015 | Muramoto et al. |
| 2015/0218125 A1 | 8/2015 | Bae et al. |
| 2015/0232729 A1 | 8/2015 | Zhao et al. |
| 2015/0258093 A1 | 9/2015 | Miller et al. |
| 2015/0283254 A1 | 10/2015 | Duvall et al. |
| 2015/0297526 A1 | 10/2015 | Puniya et al. |
| 2015/0374634 A1 | 12/2015 | Koo et al. |
| 2016/0045446 A1 | 2/2016 | Shibata et al. |
| 2016/0187323 A1 | 6/2016 | Farokhzad et al. |
| 2016/0193246 A1 | 7/2016 | Grandfils et al. |
| 2016/0194368 A1 | 7/2016 | Hoge et al. |
| 2016/0194625 A1 | 7/2016 | Hoge et al. |
| 2016/0220472 A1 | 8/2016 | Wang et al. |
| 2016/0243221 A1 | 8/2016 | Hoge et al. |
| 2016/0243274 A1 | 8/2016 | Chisholm et al. |
| 2016/0244501 A1 | 8/2016 | Ellsworth et al. |
| 2016/0244502 A1 | 8/2016 | Bolen et al. |
| 2016/0250170 A1 | 9/2016 | Hsu et al. |
| 2016/0279251 A1 | 9/2016 | Stayton et al. |
| 2016/0279289 A1 | 9/2016 | Chisholm et al. |
| 2016/0313566 A1 | 10/2016 | Le et al. |
| 2016/0317445 A1 | 11/2016 | Saly et al. |
| 2016/0317647 A1 | 11/2016 | Ciaramella et al. |
| 2016/0375017 A1 | 12/2016 | Asmus et al. |
| 2016/0375143 A1 | 12/2016 | Gunatillake |
| 2016/0376333 A1 | 12/2016 | Procko et al. |
| 2017/0002060 A1 | 1/2017 | Bolen et al. |
| 2017/0079932 A1 | 3/2017 | Emgenbroich et al. |
| 2017/0087174 A1 | 3/2017 | Beumont et al. |
| 2017/0105945 A1 | 4/2017 | Emgenbroich et al. |
| 2017/0119690 A1 | 5/2017 | Hansen et al. |
| 2017/0128380 A1 | 5/2017 | Wang |
| 2017/0173128 A1 | 6/2017 | Hoge et al. |
| 2017/0211023 A1 | 7/2017 | Zhang |
| 2017/0231989 A1 | 8/2017 | Hayashi et al. |
| 2017/0240765 A1 | 8/2017 | Nabuurs et al. |
| 2017/0247381 A1 | 8/2017 | Mao et al. |
| 2017/0296484 A1 | 10/2017 | Kottayil et al. |
| 2017/0304213 A1 | 10/2017 | Shi et al. |
| 2017/0327463 A1 | 11/2017 | Fung et al. |
| 2018/0031971 A1 | 2/2018 | Hustad et al. |
| 2018/0031972 A1 | 2/2018 | Hustad et al. |
| 2018/0200190 A1 | 7/2018 | Dharmadhikari et al. |
| 2018/0221295 A1 | 8/2018 | Hansen et al. |
| 2018/0221300 A1 | 8/2018 | Emgenbroich et al. |
| 2018/0221402 A1 | 8/2018 | Prieve et al. |
| 2018/0230489 A1 | 8/2018 | Kotin |
| 2018/0237800 A1 | 8/2018 | Murthy et al. |
| 2018/0318365 A1 | 11/2018 | Yeung et al. |
| 2018/0333683 A1 | 11/2018 | Liu et al. |
| 2018/0346797 A1 | 12/2018 | Kalgaonkar et al. |
| 2019/0000765 A1 | 1/2019 | Hattori et al. |
| 2019/0054069 A1 | 2/2019 | Chen et al. |
| 2019/0060425 A1 | 2/2019 | Scheel et al. |
| 2019/0070143 A1 | 3/2019 | Boulas et al. |
| 2019/0070233 A1 | 3/2019 | Yeung et al. |
| 2019/0077923 A1 | 3/2019 | Beaume et al. |
| 2019/0091339 A1 | 3/2019 | Miller et al. |
| 2019/0099381 A1 | 4/2019 | Gong et al. |
| 2019/0125663 A1 | 5/2019 | Herry et al. |
| 2019/0153471 A1 | 5/2019 | Paul et al. |
| 2019/0192691 A1 | 6/2019 | Barrett et al. |
| 2019/0194376 A1 | 6/2019 | Maejima et al. |
| 2019/0203030 A1 | 7/2019 | Cheong et al. |
| 2019/0224339 A1 | 7/2019 | Paul et al. |
| 2019/0231712 A1 | 8/2019 | Matsumoto et al. |
| 2019/0247350 A1 | 8/2019 | Mizugaki et al. |
| 2019/0254966 A1 | 8/2019 | Bellinger et al. |
| 2019/0270991 A1 | 9/2019 | Foot et al. |
| 2019/0274346 A1 | 9/2019 | Gore et al. |
| 2019/0358341 A1 | 11/2019 | Adams |
| 2019/0365773 A1 | 12/2019 | Yokoyama et al. |
| 2019/0376120 A1 | 12/2019 | Strauss |
| 2019/0382837 A1 | 12/2019 | Spurbeck et al. |
| 2020/0016092 A1 | 1/2020 | Bernardo et al. |
| 2020/0038390 A1 | 2/2020 | Park et al. |
| 2020/0051813 A1 | 2/2020 | Osaki et al. |
| 2020/0069696 A1 | 3/2020 | Liu |
| 2020/0078463 A1 | 3/2020 | Park et al. |
| 2020/0086616 A1 | 3/2020 | Meise et al. |
| 2020/0123391 A1 | 4/2020 | Habets et al. |
| 2020/0129440 A1 | 4/2020 | Baek et al. |
| 2020/0138072 A1 | 5/2020 | Yucel et al. |
| 2020/0163962 A1 | 5/2020 | Jahagirdar et al. |
| 2020/0165630 A1 | 5/2020 | Paul et al. |
| 2020/0171169 A1 | 6/2020 | Duvall et al. |
| 2020/0188290 A1 | 6/2020 | Herrmann et al. |
| 2020/0197289 A1 | 6/2020 | Wang et al. |
| 2020/0206133 A1 | 7/2020 | Alsenz et al. |
| 2020/0224022 A1 | 7/2020 | Gigmes et al. |
| 2020/0261426 A1 | 8/2020 | Park et al. |

(56) References Cited

U.S. PATENT DOCUMENTS

| | | |
|---|---|---|
| 2020/0308331 A1 | 10/2020 | Kang et al. |
| 2020/0390752 A1 | 12/2020 | Moon et al. |
| 2021/0069111 A1 | 3/2021 | Reineke et al. |
| 2021/0128479 A1 | 5/2021 | Cheng et al. |
| 2021/0163933 A1 | 6/2021 | Budnik et al. |
| 2021/0163985 A1 | 6/2021 | Sah et al. |
| 2021/0196682 A1 | 7/2021 | Chen et al. |
| 2021/0213002 A1 | 7/2021 | Natori et al. |
| 2021/0330599 A1 | 10/2021 | Benoit et al. |
| 2021/0347950 A1 | 11/2021 | Kou et al. |
| 2021/0355454 A1 | 11/2021 | Cardinal et al. |
| 2021/0371470 A1 | 12/2021 | Murlidharan et al. |
| 2021/0373002 A1 | 12/2021 | Gopinath et al. |
| 2021/0387156 A1 | 12/2021 | Oschmann et al. |
| 2021/0387946 A1 | 12/2021 | Lindemann et al. |
| 2022/0008346 A1 | 1/2022 | Wilson et al. |
| 2022/0016098 A1 | 1/2022 | Cho et al. |
| 2022/0016271 A1 | 1/2022 | Farokhzad et al. |
| 2022/0025428 A1 | 1/2022 | Hughes |
| 2022/0031607 A1 | 2/2022 | Cho et al. |
| 2022/0143062 A1 | 5/2022 | Kahvejian et al. |
| 2022/0175812 A1 | 6/2022 | Duong et al. |
| 2022/0227778 A1 | 7/2022 | Wang |
| 2022/0233514 A1 | 7/2022 | Choi et al. |
| 2022/0233580 A1 | 7/2022 | Takeshita et al. |
| 2022/0243225 A1 | 8/2022 | Mathur et al. |
| 2022/0291432 A1 | 9/2022 | O'Keeffe |
| 2022/0333097 A1 | 10/2022 | Duong et al. |
| 2022/0396789 A1 | 12/2022 | Banal et al. |
| 2023/0059080 A1 | 2/2023 | Lee et al. |
| 2023/0067461 A1 | 3/2023 | Lee et al. |
| 2023/0092431 A1 | 3/2023 | Isabella et al. |
| 2023/0218536 A1 | 7/2023 | Solomun et al. |
| 2023/0227687 A1 | 7/2023 | Li et al. |
| 2023/0310621 A1 | 10/2023 | Grandfils et al. |
| 2024/0067960 A1 | 2/2024 | Gupta et al. |
| 2024/0074981 A1 | 3/2024 | Gupta et al. |
| 2025/0108125 A1 | 4/2025 | Sims, Jr. |
| 2025/0109235 A1 | 4/2025 | Gupta |

FOREIGN PATENT DOCUMENTS

| | | |
|---|---|---|
| CN | 1806901 A | 7/2006 |
| CN | 1813683 A | 8/2006 |
| CN | 1896112 A | 1/2007 |
| CN | 101444513 A | 6/2009 |
| CN | 101643412 A | 2/2010 |
| CN | 101735383 A | 6/2010 |
| CN | 102030871 A | 4/2011 |
| CN | 102250278 A | 11/2011 |
| CN | 102949342 A | 3/2013 |
| CN | 103113509 A | 5/2013 |
| CN | 103255174 A | 8/2013 |
| CN | 103319668 A | 9/2013 |
| CN | 103333283 A | 10/2013 |
| CN | 103536972 A | 1/2014 |
| CN | 103755870 A | 4/2014 |
| CN | 103976972 A | 8/2014 |
| CN | 104479064 A | 4/2015 |
| CN | 104772051 A | 7/2015 |
| CN | 104784155 A | 7/2015 |
| CN | 104922078 A | 9/2015 |
| CN | 104971073 A | 10/2015 |
| CN | 105504923 A | 4/2016 |
| CN | 105833272 A | 8/2016 |
| CN | 105833287 A | 8/2016 |
| CN | 105949365 A | 9/2016 |
| CN | 106117580 A | 11/2016 |
| CN | 106236785 A | 12/2016 |
| CN | 106478904 A | 3/2017 |
| CN | 106811998 A | 6/2017 |
| CN | 107173546 A | 9/2017 |
| CN | 107596368 A | 1/2018 |
| CN | 109422960 A | 3/2019 |
| CN | 115714187 A | 2/2023 |
| DE | 2446449 A1 | 4/1975 |
| EP | 0217137 A2 | 4/1987 |
| EP | 0587333 A2 | 3/1994 |
| EP | 0597577 A1 | 5/1994 |
| EP | 0945148 A1 | 9/1999 |
| EP | 1008634 A1 | 6/2000 |
| GB | 1284489 A | 8/1972 |
| GB | 1314285 A | 4/1973 |
| GB | 1324087 A | 7/1973 |
| IN | 2012MU01581 A | 1/2014 |
| IN | 2014KO01127 A | 5/2016 |
| IN | 201611026597 A | 3/2018 |
| IN | 201921005566 A | 8/2020 |
| JP | S5156886 A | 5/1976 |
| JP | S51100129 A | 9/1976 |
| JP | H01229014 A | 9/1989 |
| JP | 2003345095 A | 12/2003 |
| JP | 2008274217 A | 11/2008 |
| JP | 2008274218 A | 11/2008 |
| JP | 2008274219 A | 11/2008 |
| JP | 2009016258 A | 1/2009 |
| JP | 2010111781 A | 5/2010 |
| JP | 2011074250 A | 4/2011 |
| JP | 2011207963 A | 10/2011 |
| JP | 2013029832 A | 2/2013 |
| JP | 2013114184 A | 6/2013 |
| JP | 2013237821 A | 11/2013 |
| JP | 2016065115 A | 4/2016 |
| JP | 2016126154 A | 7/2016 |
| JP | 2017058405 A | 3/2017 |
| JP | 2018154752 A | 10/2018 |
| JP | 2018174919 A | 11/2018 |
| JP | 2018203987 A | 12/2018 |
| JP | 2019127444 A | 8/2019 |
| JP | 2020074704 A | 5/2020 |
| JP | 2022057447 A | 4/2022 |
| JP | 2022076360 A | 5/2022 |
| JP | 2022117407 A | 8/2022 |
| KR | 830000972 B1 | 4/1983 |
| KR | 20020016069 A | 3/2002 |
| KR | 20030078118 A | 10/2003 |
| KR | 20050023239 A | 3/2005 |
| KR | 20080002313 A | 1/2008 |
| KR | 20080008769 A | 1/2008 |
| KR | 100867639 B1 | 11/2008 |
| KR | 20080097787 A | 11/2008 |
| KR | 20090114190 A | 11/2009 |
| KR | 100994148 B1 | 11/2010 |
| KR | 20110043347 A | 4/2011 |
| KR | 20110117758 A | 10/2011 |
| KR | 20110119542 A | 11/2011 |
| KR | 20110135018 A | 12/2011 |
| KR | 20120047345 A | 5/2012 |
| KR | 20120134329 A | 12/2012 |
| KR | 20120134605 A | 12/2012 |
| KR | 20130010708 A | 1/2013 |
| KR | 20130013157 A | 2/2013 |
| KR | 20130027822 A | 3/2013 |
| KR | 20130030907 A | 3/2013 |
| KR | 101312286 B1 | 9/2013 |
| KR | 20140095767 A | 8/2014 |
| KR | 20140105941 A | 9/2014 |
| KR | 101458468 B1 | 11/2014 |
| KR | 20140130579 A | 11/2014 |
| KR | 20150105043 A | 9/2015 |
| KR | 20170076494 A | 7/2017 |
| KR | 101827744 B1 | 2/2018 |
| KR | 20180029147 A | 3/2018 |
| KR | 101850629 B1 | 4/2018 |
| KR | 20180099263 A | 9/2018 |
| KR | 101923028 B1 | 11/2018 |
| KR | 101943270 B1 | 1/2019 |
| KR | 20190111448 A | 10/2019 |
| KR | 102107332 B1 | 5/2020 |
| KR | 102157964 B1 | 9/2020 |
| KR | 20200123022 A | 10/2020 |
| KR | 102207353 B1 | 1/2021 |
| KR | 102207354 B1 | 1/2021 |
| KR | 102212503 B1 | 2/2021 |

(56) References Cited

FOREIGN PATENT DOCUMENTS

| | | |
|---|---|---|
| KR | 102212504 B1 | 2/2021 |
| KR | 102212505 B1 | 2/2021 |
| KR | 20210122720 A | 10/2021 |
| PL | 440443 A1 | 8/2023 |
| RU | 2582704 C1 | 4/2016 |
| TW | 201204713 A | 2/2012 |
| TW | 201404805 A | 2/2014 |
| WO | 1991013145 A1 | 9/1991 |
| WO | 1998051749 A1 | 11/1998 |
| WO | 03/090780 A1 | 11/2003 |
| WO | 2004090004 A1 | 10/2004 |
| WO | 2004096422 A1 | 11/2004 |
| WO | 2007060462 A1 | 5/2007 |
| WO | 2008005543 A2 | 1/2008 |
| WO | 2007078765 A2 | 4/2008 |
| WO | 2008050987 A1 | 5/2008 |
| WO | 2009038340 A1 | 3/2009 |
| WO | 2009088220 A2 | 7/2009 |
| WO | 2009103735 A1 | 8/2009 |
| WO | 2009125987 A2 | 10/2009 |
| WO | 2009127922 A2 | 10/2009 |
| WO | 2009134053 A2 | 11/2009 |
| WO | 2009134076 A2 | 11/2009 |
| WO | 2009141159 A1 | 11/2009 |
| WO | 2009142421 A2 | 11/2009 |
| WO | 2009151295 A2 | 12/2009 |
| WO | 2010008203 A2 | 1/2010 |
| WO | 2010008244 A2 | 1/2010 |
| WO | 2011025167 A2 | 3/2011 |
| WO | 2011025267 A2 | 3/2011 |
| WO | 2011025269 A2 | 3/2011 |
| WO | 2011025270 A2 | 3/2011 |
| WO | 2011025271 A2 | 3/2011 |
| WO | 2011110841 | 9/2011 |
| WO | 2011/154331 A1 | 12/2011 |
| WO | 2012/101235 A1 | 8/2012 |
| WO | 2012061719 A3 | 8/2012 |
| WO | 2012108631 A2 | 8/2012 |
| WO | 2012119997 A1 | 9/2012 |
| WO | 2012138013 A1 | 10/2012 |
| WO | 2012140415 A1 | 10/2012 |
| WO | 2012156058 A1 | 11/2012 |
| WO | 2012156059 A1 | 11/2012 |
| WO | 2012158610 A1 | 11/2012 |
| WO | 2013003887 A1 | 1/2013 |
| WO | 2013135853 A1 | 9/2013 |
| WO | 2014109308 A1 | 7/2014 |
| WO | 2015089419 A2 | 6/2015 |
| WO | 2015/134787 A2 | 9/2015 |
| WO | 2016025747 A1 | 2/2016 |
| WO | 2016164762 A1 | 10/2016 |
| WO | 2016195153 A1 | 12/2016 |
| WO | 2017/184768 A1 | 10/2017 |
| WO | 2017176040 A1 | 10/2017 |
| WO | 2017/210666 A2 | 12/2017 |
| WO | 2018112555 A1 | 6/2018 |
| WO | 2018190355 A1 | 10/2018 |
| WO | 2019/027767 A1 | 2/2019 |
| WO | 2019088662 A1 | 5/2019 |
| WO | 2019/126627 A1 | 6/2019 |
| WO | 2019/152957 A1 | 8/2019 |
| WO | 2019199133 A1 | 10/2019 |
| WO | 2019220088 A1 | 11/2019 |
| WO | 2020017808 A1 | 1/2020 |
| WO | 2020/051507 A1 | 3/2020 |
| WO | 2020080875 A1 | 4/2020 |
| WO | 2020106916 A1 | 5/2020 |
| WO | 2020247382 A1 | 12/2020 |
| WO | 2021007382 A1 | 1/2021 |
| WO | 2021076977 A1 | 4/2021 |
| WO | 2021091188 A1 | 5/2021 |
| WO | 2021125797 A1 | 6/2021 |
| WO | 2021194253 A1 | 9/2021 |
| WO | 2021255262 A1 | 12/2021 |
| WO | 2022091971 A1 | 5/2022 |
| WO | 2022120194 A1 | 6/2022 |
| WO | 2022129097 A2 | 6/2022 |
| WO | 2022139687 A1 | 6/2022 |
| WO | 2022192591 A1 | 9/2022 |
| WO | 2022216977 A1 | 10/2022 |
| WO | 2022245307 A1 | 11/2022 |
| WO | 2022266119 A1 | 12/2022 |
| WO | 2023023055 A1 | 2/2023 |
| WO | 2023107574 A2 | 6/2023 |
| WO | 2023193244 A1 | 10/2023 |
| WO | 2023239921 A1 | 12/2023 |
| WO | 2023239922 A1 | 12/2023 |
| WO | 2024036356 A1 | 2/2024 |

OTHER PUBLICATIONS

Walter et al., Characterization of a Bean (*Phaseolus vulgaris* L.) Malic-Enzyme Gene, European Journal of Biochemistry, 1994, 999-1009. (Year: 1994).

Institute Pasture, Allele Information, Leptospira locus/sequence definitions—LIC_RS02325: 95, 2017, 1-2. Obtained online at: https://www.psbigsdb.pasteur.frcgibinbigsdbbigsdb.pldb=pubmlst_leptospira_seqdef&page=alleleInfo&locus=LIC_RS02325&allele_id=95 on Nov. 11, 2024. (Year: 2017).

European Search Report for EP Application No. 21901543.5 dated Nov. 27, 2024, 17 pages.

International Search Report and Written Opinion issued in App. No. PCT/US2024/049026, dated Jan. 2, 2025, 13 pages.

Dalal et al., "Polymer design via SHAP and Bayesian machine learning optimizes pDNA and CRISPR ribonucleoprotein delivery," Chem. Sci., 2024, 15, pp. 7219-7228.

International Search Report and Written Opinion for PCT/US2024/049148, mailed Jan. 28, 2025.

Williams et al., "Glycosylated Reversible Addition-Fragmentation Chain Transfer Polymers with Varying Polyethylene Glycol Linkers Produce Different Short Interfering RNA Uptake, Gene Silencing, and Toxicity Profiles", Biomacromolecules, vol. 18, No. 12, Dec. 11, 2017 (Dec. 11, 2017), pp. 4099-4112, XP055881054, ISSN: 1525-7797, DOI: 10.1021/acs.biomac.7b01168.

Wu Yaoying et al., "Glucose-Containing Diblock Polycations Exhibit Molecular Weight, Charge, and Cell-Type Dependence for pDNA Delivery", Biomacromolecules, vol. 15, No. 5, May 12, 2014 (May 12, 2014), pp. 1716-1726, XP093238175, ISSN: 1525-7797, DOI: 10.1021/bm5001229.

Ahmed et al., "The effect of polymer architecture, composition, and molecular weight on the properties of glycopolymer-based non-viral gene delivery systems", Biomaterials, Elsevier, Amsterdam, NL, vol. 32, No. 22, Mar. 30, 2011 (Mar. 30, 2011), pp. 5279-5290, XP028214661, ISSN: 0142-9612, DOI: 10.1016/J.BIOMATERIALS.2011.03.082.

Alidedeoglu et al., "Bioconjugation of D-glucuronic acid sodium salt to well-defined primary amine-containing homopolymers and block copolymers", Journal of Polymer Science Part A: Polymer Chemistry, vol. 48, No. 14, Jun. 14, 2010 (Jun. 14, 2010), pp. 3052-3061, XP055185110, ISSN: 0887-624x, DOI: 10.1002/pola.24083.

Cheng C, Convertine AJ, Stayton PS, Bryers JD. Multifunctional triblock copolymers for intracellular messenger RNA delivery. Biomaterials. Oct. 2012;33(28):6868-76. doi: 10.1016/j.biomaterials.2012.06.020. Epub Jul. 9, 2012. PMID: 22784603; PMCID: PMC3412061.

Conesa, Ana et al., "A survey of best practices for RNA-seq data analysis." Genome Biology, Jan. 26, 2016, vol. 17, No. 13; doi:10.1186/s13059-016-0881-8.

Convertine et al. "Development of a novel endosomolytic diblock copolymer for siRNA delivery." Journal of controlled release : official journal of the Controlled Release Society vol. 133,3 (2009): 221-9. DOI: 10.1016/j.jconrel.2008.10.004.

Convertine et al. "pH-responsive polymeric micelle carriers for siRNA drugs." Biomacromolecules vol. 11,11 (2010): 2904-11. doi:10.1021/bm100652w.

Counsell, John R et al. "Lentiviral vectors can be used for full-length dystrophin gene therapy." Scientific reports vol. 7,1 79. Mar. 6, 2017, doi:10.1038/s41598-017-00152-5.

(56) References Cited

OTHER PUBLICATIONS

Dahlman JE, Kauffman KJ, Xing Y, Shaw TE, Mir FF, Dlott CC, Langer R, Anderson DG, Wang ET. Barcoded nanoparticles for high throughput in vivo discovery of targeted therapeutics. Proc Natl Acad Sci U S A. Feb. 21, 2017;114(8):2060-2065. doi: 10.1073/pnas.1620874114. Epub Feb. 6, 2017. PMID: 28167778; PMCID: PMC5338412.
Grimme et al. "Polycation Architecture Affects Complexation and Delivery of Short Antisense Oligonucleotides: Micelleplexes Outperform Polyplexes." Biomacromolecules 2022, 23, 8, 3257-3271, doi:10.1021/acs.biomac.2c00338.
Haridharan et al. "Exploration of Novel Pyrene Labeled Amphiphilic Block Copolymers: Synthesis via ATRP, Characterization and Properties." Journal of Macromolecular Science, Part A, vol. 47, No. 9, Jul. 2010, pp. 918-926, doi:10.1080/10601325.2010.501681.
International Search Report and Written Opinion for PCT/US2023/024960, dated Aug. 31, 2023.
Kanth et al. "Recent advances in development of poly (dimethylaminoethyl methacrylate) antimicrobial polymers, European Polymer Journal." vol. 163, 2022, doi:10.1016/j.eurpolymj.2021.110930.
Lauber et al. "pH- and Thermoresponsive Self-Assembly of Cationic Triblock Copolymers with Controlled Dynamics." Macromolecules 2017, 50, 1, 416-423. doi:10.1021/acs.macromol.6b02201.
Lucas, Christopher R et al. "DNA Origami Nanostructures Elicit Dose-Dependent Immunogenicity and Are Nontoxic up to High Doses In Vivo." Small (Weinheim an der Bergstrasse, Germany) vol. 18,26 (2022): e2108063. doi:10.1002/smll.202108063.
Manganiello et al. "Diblock copolymers with tunable pH transitions for gene delivery." Biomaterials vol. 33,7 (2012): 2301-9. doi:10.1016/j.biomaterials.2011.11.019.
Muehlebach et al. "Synthesis of Well-Defined Macromonomers and Comb Copolymers from Polymers Made by Atom Transfer Radical Polymerization." J Polym Sci Part A: Polym Chem. vol. 41,21 (2003): 3425-3439, doi:10.1002/pola.10940.
Okondo et al., DPP8/9 inhibition induces pro-caspase-1-dependent monocyte and macrophage pyroptosis, Nature Chemical Biology, vol. 13, No. 1, pp. 46-53, Jan. 2017.
Okondo et al., Inhibition of Dpp8/9 Activates the Nlrp1 b Inflammasome, Cell Chemical Biology, vol. 25, pp. 262-267, Mar. 15, 2018.
PCT Search Report and Written Opinion for PCT/US2023/024961, mailed Oct. 6, 2023, 14 pages.
PCT Search Report for PCT/US2021/061846, mailed Mar. 30, 2022.
PCT Written Opinion for PCT/US2022/023902, mailed Sep. 9, 2022.
Pegg et al. "Solubilisation of oils in aqueous solutions of a random cationic copolymer." Journal of colloid and interface science vol. 502 (2017): 210-218. doi:10.1016/j.jcis.2017.04.093.
Ponnuswamy, Oligolysine coating, Nature Comm. p. 1 (May 2017).
Samanta, Anirban, and Igor L Medintz. "Nanoparticles and DNA—a powerful and growing functional combination in bionanotechnology." Nanoscale vol. 8, 17 (2016): 9037-95. doi:10.1039/c5nr08465b.
Shimatani et al. Chapter 22 Targeted Base Editing with CRISPR-Deaminase in Tomato. pp. 297-307 in Qi, Y. [eds] Plant Genome Editing with CRISPR Systems. Methods in Molecular Biology, vol. 1917. Humana Press, New York, NY. (Year: 2019).
Sprouse et al. "Tuning Cationic Block Copolymer Micelle Size by pH and Ionic Strength." Biomacromolecules 2016, 17, 9, 2849-2859. DOI:10.1021/acs.biomac.6b00654.
Tapio et al. "The potential of DNA origami to build multifunctional materials." Multifunctional Materials, vol. 3, No. 3, DOI: 10.1088/2399-7532/ab80d5.
The Protein Man, "High Efficiency & Stability Protein Crosslinking with EDC & NHS." The Protein Man's Blog—a Discussion of Protein Research, G-Biosciences, Sep. 26, 2017. Available online at (https://info.gbiosciences.com/blog/2-step-protein-coupling-edc-nhs).
The Protein Man, "Modifying Oligonucleotide 5'-Phosphates by EDC for Improved Coupling." The Protein Man's Blog—a Discussion of Protein Research, G-Biosciences, Aug. 29, 2017. Available online at (https://info.gbiosciences.com/blog/modifying-oligonucleotide-5-phosphates-by-edc-for-improved-coupling).
Yamada, Yoji, Nucleic Acid Drugs-Current Status, Issues and Expectations, Cancers, 2021, 13(19), 5002, 1-19. (Year: 2021).
Zhang, Huan et al. "DNA nanostructures coordinate gene silencing in mature plants." Proceedings of the National Academy of Sciences of the United States of America vol. 116, 15 (2019): 7543-7548. doi:10.1073/pnas.1818290116.
International Search Report and Written Opinion issued for PCT/US2024/059000, mailed Apr. 16, 2025.
Ishihara et al., "Water-Soluble and Cytocompatible Phospholipid Polymers for Molecular Complexation to Enhance Biomolecule Transportation to Cells In Vitro," Polymers, 2020, 12:1762) (Year: 2020) DOI: 10.3390/polym12081762.

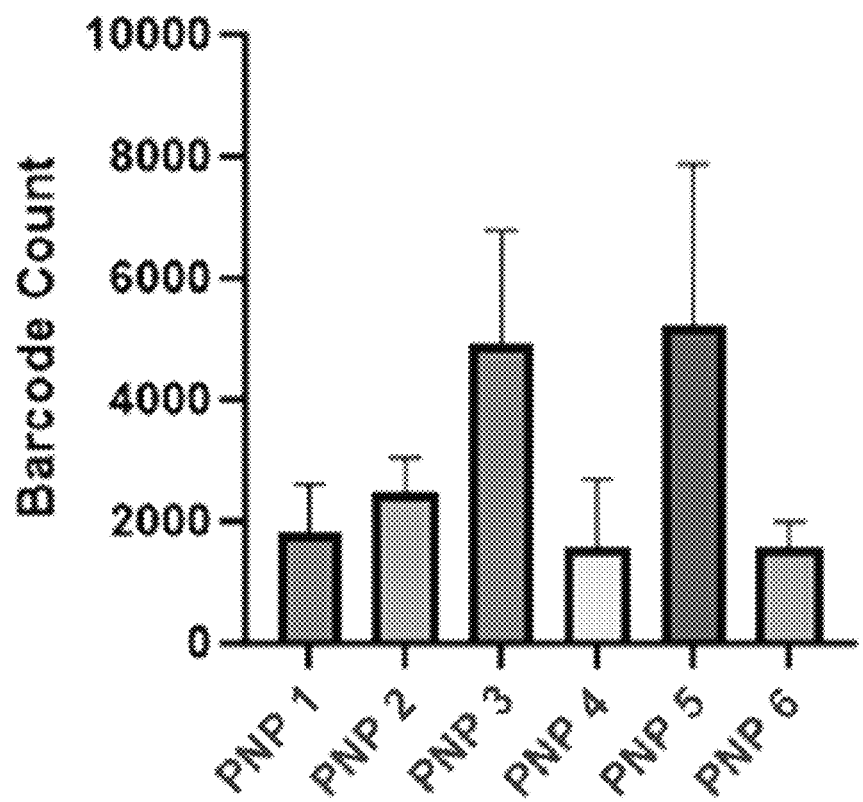

POLYMER NANOPARTICLE COMPOSITIONS FOR IN VIVO EXPRESSION OF POLYPEPTIDES

RELATED APPLICATIONS

This application claims the benefit of U.S. Provisional Application No. 63/586,849, filed Sep. 29, 2023, the entire disclosure of which is incorporated herein by reference.

BACKGROUND

Genetic medicines (including gene therapy, gene silencing, splicing regulators, and nuclease based gene editors) are poised to produce revolutionary treatments, including vaccines, infectious disease treatments, antimicrobial treatments, antiviral treatments, and most notably, genetic disease treatments. However, the in vivo delivery of these genetic medicine payloads to the specific tissues and cells that need to be treated, while avoiding tissues and cells that can reduce the efficacy or safety of the genetic medicine, poses a significant challenge. Additional challenges include the ability to deliver large genetic payloads or multiple payloads. Adeno-associated viruses (AAVs) are the most widely used tool for genetic medicine delivery, but AAVs are not able to deliver large genetic payloads or multiple payloads, and they sometimes trigger unwanted immune responses, including the generation of anti-AAV antibodies, a cell mediated response. Some of the immune responses caused by AAV in patients are potentially fatal immune responses.

Thus, there is a need for effective non-viral delivery systems, including gene delivery systems. The current state-of-the-art non-viral gene delivery systems, such as liposomes, have many drawbacks such as poor biocompatibility and the inability to easily engineer or functionalize them. Additional concerns are that such non-viral gene delivery systems are easily degraded by various enzymes as they pass through intracellular or intercellular compartments, and these systems have not been able to package multiple large payloads.

SUMMARY

In some aspects, the disclosure provides for a composition comprising a non-viral delivery vehicle comprising one or more nanoparticle forming polymers, and a nucleic acid construct. In certain aspects, a block copolymer comprises:
a first block homopolymer of monomer units, wherein each monomer unit is represented by formula I:

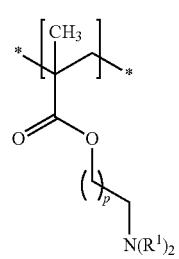

(I)

or a salt thereof, wherein:
p is 0 or an integer selected from 1-3,
each $R^1$ is individually selected from $C_1$-$C_6$ alkyl; and
wherein each * individually represents a point of covalent attachment to the rest of the block copolymer; and
a second block of either:
  (i) a homopolymer of monomer units, wherein each monomer unit is represented by formula II:

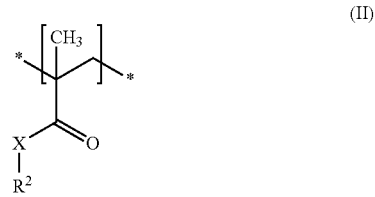

(II)

or a salt thereof, wherein:
X is —O— or —NR$^3$—;
$R^2$ is H, $C_1$-$C_6$ alkyl, or $C_2$-$C_6$ alkenyl, and
$R^3$ is $C_1$-$C_6$ alkyl; or
  (ii) a copolymer comprising a copolymer of two monomer units, wherein each monomer unit is individually represented by formula II:

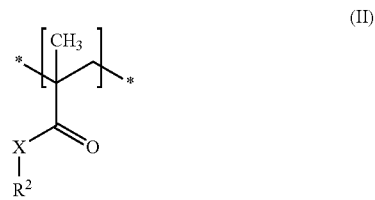

(II)

or a salt thereof, wherein:
X is —O— or —NR$^3$—;
$R^2$ is H, $C_1$-$C_6$ alkyl, or $C_2$-$C_6$ alkenyl, and
$R^3$ is $C_1$-$C_6$ alkyl;
  wherein each * individually represents a point of covalent attachment to the rest of the block copolymer; and
  wherein the first block has a molecular weight of at least 20,000 Da.

In certain aspects, the disclosure provides for a block copolymer comprises a first block and a second block, wherein:
  (i) the first block comprises poly-2-(dimethylamino)ethyl methacrylate (DMAEMA); and
  (ii) the second block comprises:
    (a) a homopolymer comprising poly-monomethyl methacrylate (MMA) or poly-vinyl methacrylate (VMA); or
    (b) a copolymer comprising two of butylmethacrylate (BMA), MAA, VMA, and N,N-diethylacrylamide (DEAAM).

In certain aspects, a polymer nanoparticle comprises:
a block copolymer according to the present disclosure,
wherein the nanoparticle has a hydrodynamic diameter of about 10 nm to about 1000 nm.

In certain aspects, the disclosure provides for a composition comprising a polymer nanoparticle according to the present disclosure, and a nucleic acid complexed to the polymer nanoparticle. In certain aspects, the nucleic acid encodes an antibody.

In certain aspects, the disclosure provides for a method of treating a disease in a patient in need thereof, comprising administering a therapeutically effective amount of a composition according to the present disclosure.

In certain aspects, the PNPs of the present disclosure are useful as a transfection agent.

BRIEF DESCRIPTION OF THE DRAWINGS

FIG. 1 shows the presence of the PNPs in the lung.

DETAILED DESCRIPTION

This disclosure provides polymer compositions that have been discovered to be useful for the expression of a full length antibody, including both the heavy and light chain of the antigen binding fragment (Fab) and the crystal fragment (Fc). Such an antibody is useful because the Fab portion is able to selectively bind and neutralize a pathogen with high specificity, and the Fc portion is able to signal to the immune system to initiate both innate and adaptive immune responses. These full length antibodies are typically produced in B cells. However, delivering a gene construct that encodes for the expression of these antibody portions allows the full-length antibody to be produced in any cell of the human body, including somatic cells of particular tissue. Described herein is a gene pDNA that encodes for all portions of a full monoclonal antibody (mAb), with inserted sequences that encode for the variable heavy and light chains that selectively binds to the receptor binding domain (RBD) of the SARS-CoV-2 virus. Also described herein is that this gene construct could form a complex with polymer nanoparticles which, when introduced into a culture of HEK-293 cells, resulted in the production of antibodies that could both bind the RBD antigen target in an ELISA, and also neutralize the target in a microneutralization assay.

In one aspect of this disclosure, the polymer nanoparticles can lead to the expression of a full antibody in cells that are not typical antibody producing cells. As described herein, this expression can occur in HEK-293 cells, thus suggesting that these nanoparticles can be used to express antibodies in other somatic cells in the human body. In certain embodiments, an advantage is that, compared to the current method of systemically administering exogenously produced antibodies, these antibodies could be produced endogenously, within the patient, within the tissue that is most susceptible to the exposure to the pathogen. For example, as a prophylactic for SARS-CoV-2, a recently exposed, high risk individual, or an individual with a high risk of being exposed to the virus in the near future, could be given the PNP expressing antibody for rapid, sustained expression of the antibody within their lungs. In certain aspects, the PNPs and the gene constructs can be manufactured and purified more affordably than exogenous antibodies, their on-shelf stability is better, and the persistence of the antibody in the tissues needed as well as in systemic circulation may be more prolonged.

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended clauses.

For the sake of brevity, the disclosures of the publications cited in this specification, including patents, are herein incorporated by reference. Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

As used herein, the singular forms "a," "an," and "the" include plural referents unless the context clearly dictates otherwise. It is further noted that the clauses may be drafted to exclude any optional element. As such, this statement is intended to serve as antecedent basis for use of such exclusive terminology as "solely," "only" and the like in connection with the recitation of clause elements, or use of a "negative" limitation.

As used herein, the terms "including," "containing," and "comprising" are used in their open, non-limiting sense.

To provide a more concise description, some of the quantitative expressions given herein are not qualified with the term "about." It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" may be an approximation of ±10%, ±5%, or ±1%. Whenever a yield is given as a percentage, such yield refers to a mass of the entity for which the yield is given with respect to the maximum amount of the same entity that could be obtained under the particular stoichiometric conditions. Concentrations that are given as percentages refer to mass ratios, unless indicated differently.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described. All publications mentioned herein are incorporated herein by reference to disclose and describe the methods and/or materials in connection with which the publications are cited.

Except as otherwise noted, the methods and techniques of the present embodiments are generally performed according to conventional methods well known in the art and as described in various general and more specific references that are cited and discussed throughout the present specification. See, e.g., Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

Chemical nomenclature for compounds described herein has generally been derived using the commercially-available ACD/Name 2014 (ACD/Labs) or ChemBioDraw Ultra 13.0 (Perkin Elmer).

As used herein and in connection with chemical structures depicting the various embodiments described herein, "*", "**", and " ", each represent a point of covalent attachment of the chemical group or chemical structure in which the identifier is shown to an adjacent chemical group or chemical structure. For example, in a hypothetical chemical structure A-B, where A and B are joined by a covalent bond, in some embodiments, the portion of A-B defined by the group or chemical structure A can be represented by "A-*", "A-**", or

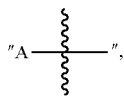

where each of "-*", "-**", and

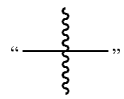

represents a bond to A and the point of covalent bond attachment to B. Alternatively, in some embodiments, the portion of A-B defined by the group or chemical structure B can be represented by "*-B", "**-B", or

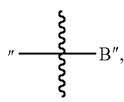

where each of "-*", "-**", and

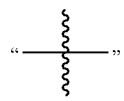

represents a bond to B and the point of covalent bond attachment to A.

As used herein, "molecular weight" refers to the weight average molecular weight (Mw) determined by a conventional polystyrene standard curve gel permeation chromatography method (hereinafter referred to as GPC) using multiple narrow distribution polystyrene standard samples relevant to the present invention and preferably between 2 kDa to 1,000 kDa.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. All combinations of the embodiments pertaining to the chemical groups represented by the variables are specifically embraced by the present disclosure and are disclosed herein just as if each and every combination was individually and explicitly disclosed, to the extent that such combinations embrace compounds that are stable compounds (i.e., compounds that can be isolated, characterized, and tested for biological activity). In addition, all subcombinations of the chemical groups listed in the embodiments describing such variables are also specifically embraced by the present disclosure and are disclosed herein just as if each and every such sub-combination of chemical groups was individually and explicitly disclosed herein.

Chemical Definitions

The term "alkyl" refers to a straight- or branched-chain monovalent hydrocarbon group. The term "alkylene" refers to a straight- or branched-chain divalent hydrocarbon group. In some embodiments, it can be advantageous to limit the number of atoms in an "alkyl" or "alkylene" to a specific range of atoms, such as $C_1$-$C_{20}$ alkyl or $C_1$-$C_{20}$ alkylene, $C_1$-$C_{12}$ alkyl or $C_1$-$C_{12}$ alkylene, or $C_1$-$C_6$ alkyl or $C_1$-$C_6$ alkylene. Examples of alkyl groups include methyl (Me), ethyl (Et), n-propyl, isopropyl, butyl, isobutyl, sec-butyl, tert-butyl (tBu), pentyl, isopentyl, tert-pentyl, hexyl, isohexyl, and groups that in light of the ordinary skill in the art and the teachings provided herein would be considered equivalent to any one of the foregoing examples. Examples of alkylene groups include methylene (—$CH_2$—), ethylene ((—$CH_2$—)$_2$), n-propylene ((—$CH_2$—)$_3$), iso-propylene ((—C(H)($CH_3$)$CH_2$—)), n-butylene ((—$CH_2$—)$_4$), and the like. It will be appreciated that an alkyl or alkylene group can be unsubstituted or substituted as described herein. An alkyl or alkylene group can be substituted with any of the substituents in the various embodiments described herein, including one or more of such substituents. Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "$C_{x-y}$" or "$C_x$-$C_y$", when used in conjunction with a chemical moiety, such as, acyl, acyloxy, alkyl, alkenyl, alkynyl, or alkoxy is meant to include groups that contain from x to y carbons in the chain. $C_0$ alkyl indicates a hydrogen where the group is in a terminal position, a bond if internal. A $C_{1-6}$ alkyl group, for example, contains from one to six carbon atoms in the chain.

The term "alkenyl" refers to a straight- or branched-chain mono-valent hydrocarbon group having one or more double bonds. In some embodiments, it can be advantageous to limit the number of atoms in an "alkenyl" to a specific range of atoms, such as $C_2$-$C_{20}$ alkenyl, $C_2$-$C_{12}$ alkenyl, or $C_2$-$C_6$ alkenyl. Examples of alkenyl groups include ethenyl (or vinyl), allyl, and but-3-en-1-yl. Included within this term are cis and trans isomers and mixtures thereof. It will be appreciated that an alkenyl can be unsubstituted or substituted as described herein. An alkenyl group can be substituted with any of the substituents in the various embodiments described herein, including one or more of such substituents.

The term "amide", as used herein, refers to a group

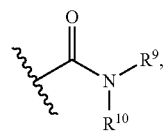

wherein $R^9$ and $R^{10}$ each independently represent a hydrogen or hydrocarbyl group, or $R^9$ and $R^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

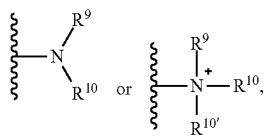

wherein $R^9$, $R^{10}$, and $R^{10'}$, each independently represent a hydrogen or a hydrocarbyl group, or $R^9$ and $R^{10}$ taken together with the N atom to which they are attached complete a heterocycle having from 4 to 8 atoms in the ring structure.

The term "alkylamino", as used herein, refers to an amino group substituted with at least one alkyl group.

The term "carboxy", as used herein, refers to a group represented by the formula —$CO_2H$.

The term "ester", as used herein, refers to a group —$C(O)OR^8$ wherein $R^8$ represents a hydrocarbyl group.

The terms "halo" and "halogen" as used herein means halogen and includes chloro, fluoro, bromo, and iodo.

The term "heteroatom" as used herein means an atom of any element other than carbon or hydrogen. Preferred heteroatoms are nitrogen, oxygen, and sulfur.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "substituted" means that the specified group or moiety bears one or more substituents. The term "unsubstituted" means that the specified group bears no substituents. Where the term "substituted" is used to describe a structural system, the substitution is meant to occur at any valency-allowed position on the system. In some embodiments, "substituted" means that the specified group or moiety bears one, two, or three substituents. In other embodiments, "substituted" means that the specified group or moiety bears one or two substituents. In still other embodiments, "substituted" means the specified group or moiety bears one substituent.

Any formula depicted herein is intended to represent a compound of that structural formula as well as certain variations or forms. For example, a formula given herein is intended to include a racemic form, or one or more enantiomeric, diastereomeric, or geometric isomers, or a mixture thereof. Additionally, any formula given herein is intended to refer also to a hydrate, solvate, or polymorph of such a compound, or a mixture thereof.

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Examples of isotopes that can be incorporated into compounds of the disclosure include isotopes of hydrogen, carbon, nitrogen, oxygen, phosphorous, fluorine, chlorine, and iodine, such as $^2H$, $^3H$, $^{11}C$, $^{13}C$, $^{14}C$, $^{15}N$, $^{18}O$, $^{17}O$, $^{31}P$, $^{32}P$, $^{35}S$, $^{18}F$, $^{36}Cl$, and $^{125}I$, respectively. Such isotopically labelled compounds are useful in metabolic studies (preferably with $^{14}C$), reaction kinetic studies (with, for example $^2H$ or $^3H$), detection or imaging techniques [such as positron emission tomography (PET) or single-photon emission computed tomography (SPECT)] including drug or substrate tissue distribution assays, or in radioactive treatment of patients. Further, substitution with heavier isotopes such as deuterium (i.e., $^2H$) may afford certain therapeutic advantages resulting from greater metabolic stability, for example increased in vivo half-life or reduced dosage requirements. Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent.

The nomenclature "$(ATOM)_i\text{-}(ATOM)_j$," with $j>i$, when applied herein to a class of substituents, is meant to refer to embodiments of this disclosure for which each and every one of the number of atom members, from i to j including i and j, is independently realized. By way of example, the term $C_1$-$C_3$ refers independently to embodiments that have one carbon member ($C_1$), embodiments that have two carbon members ($C_2$), and embodiments that have three carbon members ($C_3$).

"Acceptable salt" or "salt" is used herein to refer to an acid addition salt or a basic addition salt which is suitable for or compatible with the compounds or a desired treatment.

The disclosure also includes acceptable salts (e.g., pharmaceutically acceptable salts) of the block copolymers described herein, preferably of those described above and of the specific compounds exemplified herein, and pharmaceutical compositions comprising such salts, and methods of using such salts.

A "pharmaceutically acceptable salt" is intended to mean a salt of a free acid or base of a compound represented herein that is non-toxic, biologically tolerable, or otherwise biologically suitable for administration to the subject. See, generally, S. M. Berge, et al., "Pharmaceutical Salts," J. Pharm. Sci., 1977, 66, 1-19. Preferred pharmaceutically acceptable salts are those that are pharmacologically effective and suitable for contact with the tissues of subjects without undue toxicity, irritation, or allergic response. A compound described herein may possess a sufficiently acidic group, a sufficiently basic group, both types of functional groups, or more than one of each type, and accordingly react with a number of inorganic or organic bases, and inorganic and organic acids, to form a pharmaceutically acceptable salt.

It will be understood that the chemical entities described herein, can exist as a salt of a free acid or base of a compound represented herein and an inorganic or organic counter ion. Illustratively, the salt can be formed during the manufacture of the compound described herein (e.g., a salt or a pharmaceutically acceptable salt) or a compound described herein can be substituted to provide a salt for further manufacture, formulation, or administration reasons. As illustrated herein, certain compounds include a "$W^{\ominus}$," wherein "$W^{\ominus}$" is an inorganic counter ion (e.g., an inorganic anion) or an organic counter ion (e.g., an organic anion). In certain embodiments, $W^{\ominus}$ is an anion that is complexed with a cation of a compound of the disclosure to form a pharmaceutically acceptable salt.

The term "inorganic counter ion" represents an inorganic ion that accompanies an ionic species in order to maintain electric neutrality. An inorganic counter ion may represent an anion or cation. An inorganic counterion may accompany a free acid or base of a compound represented herein. An inorganic ion may form by a reaction of an inorganic base or inorganic acid and a compound described herein that possesses a sufficiently acidic group, a sufficiently basic group, both types of functional groups, or more than one of each type.

The term "organic counter ion" represents an organic counter ion that accompanies an ionic species in order to maintain electric neutrality. The organic ion may represent an anion or cation. An organic counter ion may accompany a free acid or base of a compound represented herein. An organic ion may form by a reaction of an organic base or organic acid and a compound described herein that possesses a sufficiently acidic group, a sufficiently basic group, both types of functional groups, or more than one of each type.

The term "acceptable acid addition salt" as used herein means any non-toxic organic or inorganic salt of any base compounds of the present disclosure. Illustrative inorganic acids which form suitable salts include hydrochloric, hydrobromic, sulfuric and phosphoric acids, as well as metal salts such as sodium monohydrogen orthophosphate and potassium hydrogen sulfate. Illustrative organic acids that form suitable salts include mono-, di-, and tricarboxylic acids such as glycolic, lactic, pyruvic, malonic, succinic, glutaric, fumaric, malic, tartaric, citric, ascorbic, maleic, benzoic, phenylacetic, cinnamic and salicylic acids, as well as sulfonic acids such as p-toluene sulfonic and methanesulfonic acids. Either the mono or di-acid salts can be formed, and such salts may exist in either a hydrated, solvated or substantially anhydrous form. In general, the acid addition salts of compounds of the present disclosureare more soluble in water and various hydrophilic organic solvents, and generally demonstrate higher melting points in comparison to their free base forms. The selection of the appropriate salt will be known to one skilled in the art. Other non-pharmaceutically acceptable salts, e.g., oxalates, may be used, for example, in the isolation of compounds of the present disclosurefor laboratory use, or for subsequent conversion to a pharmaceutically acceptable acid addition salt.

Examples of pharmaceutically acceptable salts include sulfates, pyrosulfates, bisulfates, sulfites, bisulfites, phosphates, monohydrogen-phosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington's Pharmaceutical Sciences, 17th Edition, Mack Publishing Company, Easton, Pa., 1985.

For a block copolymer that contains a basic nitrogen, a pharmaceutically acceptable salt may be prepared by any suitable method available in the art, for example, treatment of the free base with an inorganic acid, such as hydrochloric acid, hydrobromic acid, sulfuric acid, sulfamic acid, nitric acid, boric acid, phosphoric acid, and the like, or with an organic acid, such as acetic acid, phenylacetic acid, propionic acid, stearic acid, lactic acid, ascorbic acid, maleic acid, hydroxymaleic acid, isethionic acid, succinic acid, valeric acid, fumaric acid, malonic acid, pyruvic acid, oxalic acid, glycolic acid, salicylic acid, oleic acid, palmitic acid, lauric acid, a pyranosidyl acid, such as glucuronic acid or galacturonic acid, an alpha-hydroxy acid, such as mandelic acid, citric acid, or tartaric acid, an amino acid, such as aspartic acid or glutamic acid, an aromatic acid, such as benzoic acid, 2-acetoxybenzoic acid, naphthoic acid, or cinnamic acid, a sulfonic acid, such as laurylsulfonic acid, p-toluenesulfonic acid, methanesulfonic acid, or ethanesulfonic acid, or any compatible mixture of acids such as those given as examples herein, and any other acid and mixture thereof that are regarded as equivalents or acceptable substitutes in light of the ordinary level of skill in this technology.

The term "agent" is used herein to denote a chemical compound (such as an organic or inorganic compound, a mixture of chemical compounds), a biological macromolecule (such as a nucleic acid, an antibody, including parts thereof as well as humanized, chimeric and human antibodies and monoclonal antibodies, a protein or portion thereof, e.g., a peptide, a lipid, a carbohydrate), or an extract made from biological materials such as bacteria, plants, fungi, or animal (particularly mammalian) cells or tissues. Agents include, for example, agents whose structure is known, and those whose structure is not known. The ability of such agents to inhibit disease progression or reverse disease may render them suitable as "therapeutic agents" in the methods and compositions of this disclosure.

A "patient," "subject," or "individual" are used interchangeably and refer to either a human or a non-human animal. These terms include mammals, such as humans, primates, livestock animals (including bovines, porcines, etc.), companion animals (e.g., canines, felines, etc.) and rodents (e.g., mice and rats).

"Treating" a condition or patient refers to taking steps to obtain beneficial or desired results, including clinical results. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e. not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

The term "preventing" is art-recognized, and when used in relation to a condition, such as a local recurrence (e.g., pain), a disease such as cancer, a syndrome complex such as heart failure or any other medical condition, is well understood in the art, and includes administration of a compound or a composition which reduces the frequency of, or delays the onset of, symptoms of a medical condition in a subject relative to a subject which does not receive the compound or composition. Thus, prevention of cancer includes, for example, reducing the number of detectable cancerous growths in a population of patients receiving a prophylactic treatment relative to an untreated control population, and/or delaying the appearance of detectable cancerous growths in a treated population versus an untreated control population, e.g., by a statistically and/or clinically significant amount.

"Administering" or "administration of" a substance (e.g., a compound, a composition, or an agent) to a subject can be carried out using one of a variety of methods known to those skilled in the art. For example, a substance can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A substance (e.g., a compound, a composition, or agent) can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods.

Appropriate methods of administering a substance (e.g., a compound, a composition, or an agent) to a subject will also depend, for example, on the age and/or the physical condition of the subject and the chemical and biological properties of the compound or agent (e.g., solubility, digestibility, bioavailability, stability and toxicity). In some embodiments, a substance (e.g., a compound, a composition, or an agent) is administered orally, e.g., to a subject by ingestion. In some embodiments, the orally administered substance is in an extended release or slow release formulation, or administered using a device for such slow or extended release.

As used herein, the phrase "conjoint administration" refers to any form of administration of two or more different therapeutic agents such that the second agent is administered while the previously administered therapeutic agent is still effective in the body (e.g., the two agents are simultaneously effective in the patient, which may include synergistic effects of the two agents). For example, the different therapeutic compounds can be administered either in the same formulation or in separate formulations, either concomitantly or sequentially. Thus, an individual who receives such treatment can benefit from a combined effect of different therapeutic agents.

A "therapeutically effective amount" or a "therapeutically effective dose" of a drug or agent is an amount of a drug or an agent that, when administered to a subject will have the intended therapeutic effect. The full therapeutic effect does not necessarily occur by administration of one dose, and may occur only after administration of a series of doses. Thus, a therapeutically effective amount may be administered in one or more administrations. The precise effective amount needed for a subject will depend upon, for example, the subject's size, health and age, and the nature and extent of the condition being treated, such as cancer or MDS. The skilled worker can readily determine the effective amount for a given situation by routine experimentation.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present disclosure can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—CH$_2$—O-alkyl, —OP(O)(O-alkyl)$_2$ or —CH$_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "modulate" as used herein includes the inhibition or suppression of a function or activity (such as cell proliferation) as well as the enhancement of a function or activity.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). Sec, e.g., WO 01/062726.

Furthermore, certain compounds which contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

As used herein and in connection with chemical structures depicting the various embodiments described herein, a polymer may be arranged in any linear or branched configuration. For example, a polymer comprising one or more monomer units may be arranged as a homopolymer, a block copolymer, a statistical copolymer, a random copolymer, or an alternate copolymer of different monomers linked together in an alternating fashion. In one embodiment, the polymers described herein may include repeating blocks, such as in a block copolymer, of units selected from formula I and formula II.

The term "block copolymer" is known in the art, and a representative definition is that a block copolymer is a polymer comprising molecules in which there is a linear arrangement of blocks, for example a block A linearly connected to a block B, where each of the blocks (e.g., block A and block B) comprises units derived from a characteristic species or combination of species of monomer such that at least one difference exists between the species of monomer(s) of the different blocks (e.g., the monomer species or combination of species of block A is different than the monomer species or combination of species of block B.The term "statistical copolymer" is known in the art, and a representative definition is that a statistical copolymer can be a copolymer composed of monomers that form a sequence based on a statistical rule (e.g., Markovian statistics).

The term "random copolymer" is known in the art, and a representative definition is that a random copolymer describes a copolymer where the probability of finding a given type monomer residue at a particular point in the chain is equal to the mole fraction of that monomer residue in the chain and is independent of the neighboring units in the chain.

The term "alternate copolymer" is known in the art, and a representative definition is that an alternate copolymer describes a copolymer of monomers sequentially linked in a uniform pattern.

"Nucleotide" as used herein is a molecule that contains a base moiety, a sugar moiety, and a phosphate moiety. Nucleotides can be linked together through their phosphate moieties and sugar moieties creating an internucleoside linkage. The term "oligonucleotide" is sometimes used to refer to a molecule that contains two or more nucleotides linked together. The base moiety of a nucleotide can be adenine-9-yl (A), cytosine-1-yl (C), guanine-9-yl (G), uracil-1-yl (U), and thymin-1-yl (T). The sugar moiety of a nucleotide is a ribose or a deoxyribose. The phosphate moiety of a nucleotide is pentavalent phosphate. A non-limiting example of a nucleotide would be 3'-AMP (3'-adenosine monophosphate) or 5'-GMP (5'-guanosine monophosphate).

A nucleotide analog is a nucleotide that contains some type of modification to the base, sugar, and/or phosphate moieties. Modifications to nucleotides are well known in the art and would include, for example, 5-methylcytosine (5-me-C), 5 hydroxymethyl cytosine, xanthine, hypoxanthine, and 2-aminoadenine as well as modifications at the sugar or phosphate moieties.

Nucleotide substitutes are molecules having similar functional properties to nucleotides, but which do not contain a phosphate moiety, such as peptide nucleic acid (PNA). Nucleotide substitutes are molecules that will recognize nucleic acids in a Watson-Crick or Hoogsteen manner, but are linked together through a moiety other than a phosphate moiety. Nucleotide substitutes are able to conform to a double helix type structure when interacting with the appropriate target nucleic acid.

The term "polynucleotide," as used herein, means a molecule including one or more nucleic acid subunits, or nucleotides, and can be used interchangeably with "nucleic acid" or "oligonucleotide". A polynucleotide can include one or more nucleotides selected from adenosine (A), cytosine (C), guanine (G), thymine (T) and uracil (U), or variants thereof. A nucleotide can include a nucleoside and at least 1, 2, 3, 4, 5, 6, 7, 8, 9, 10, or more phosphate ($PO_3$) groups. A nucleotide can include a nucleobase, a five-carbon sugar (either ribose or deoxyribose), and one or more phosphate groups. Ribonucleotides are nucleotides in which the sugar is ribose. Polyribonucleotides or ribonucleic acids, or RNA, can refer to macromolecules that include multiple ribonucleotides that are polymerized via phosphodiester bonds. Deoxyribonucleotides are nucleotides in which the sugar is deoxyribose. As used herein, a polyribonucleotide sequence that recites thymine (T) is understood to represent uracil (U).

"Polydeoxyribonucleotides," "deoxyribonucleic acids," and "DNA" mean macromolecules that include multiple deoxyribonucleotides that are polymerized via phosphodiester bonds. "Polyribonucleotides," "ribonucleic acids," and "RNA" mean macromolecules that include multiple ribonucleotides that are polymerized via phosphodiester bonds. A nucleotide can be a nucleoside monophosphate or a nucleoside polyphosphate. A nucleotide means a deoxyribonucleoside polyphosphate, such as, e.g., a deoxyribonucleoside triphosphate (dNTP), which can be selected from deoxyadenosine triphosphate (dATP), deoxycytidine triphosphate (dCTP), deoxyguanosine triphosphate (dGTP), deoxyuridine triphosphate (dUTP) and deoxythymidine triphosphate (dTTP) dNTPs, and may include detectable tags, such as protein tags, luminescent tags or markers (e.g., fluorophores). A nucleotide can include any subunit that can be incorporated into a growing nucleic acid strand. Such subunit can be an A, C, G, T, or U, or any other subunit that is specific to one or more complementary A, C, G, T or U, or complementary to a purine (i.e., A or G, or variant thereof) or a pyrimidine (i.e., C, T or U, or variant thereof).

The term "polypeptide" refers to amino acids joined to each other by peptide bonds or modified peptide bonds, e.g., peptide isosteres, etc. and may contain modified amino acids other than the 20 gene-encoded amino acids. The polypeptides can be modified by either natural processes, such as post-translational processing, or by chemical modification techniques which are well known in the art. Modifications can occur anywhere in the polypeptide, including the peptide backbone, the amino acid side-chains and the amino or carboxyl termini.

The term "amino acid sequence" refers to a series of two or more amino acids linked together via peptide bonds wherein the order of the amino acids linkages is designated by a list of abbreviations, letters, characters or words representing amino acid residues. The amino acid abbreviations used herein are conventional one letter codes for the amino acids and are expressed as follows: A, alanine; B, asparagine or aspartic acid; C, cysteine; D aspartic acid; E, glutamate, glutamic acid; F, phenylalanine; G, glycine; H histidine; I isoleucine; K, lysine; L, leucine; M, methionine; N, asparagine; P, proline; Q, glutamine; R, arginine; S, serine; T, threonine; V, valine; W, tryptophan; Y, tyrosine; Z, glutamine or glutamic acid.

The phrase "nucleic acid" as used herein refers to a naturally occurring or synthetic oligonucleotide or polynucleotide, whether DNA or RNA or DNA-RNA hybrid, single-stranded or double-stranded, sense or antisense, which is capable of hybridization to a complementary nucleic acid by Watson-Crick base-pairing. Nucleic acids can also include nucleotide analogs (e.g., BrdU), and non-phosphodiester internucleoside linkages (e.g., peptide nucleic acid (PNA) or thiodiester linkages). In particular, nucleic acids can include, without limitation, DNA, RNA, cDNA, gDNA, ssDNA, dsDNA or any combination thereof.

The term "vector" or "construct" designates a nucleic acid sequence capable of transporting into a cell another nucleic acid to which the vector sequence has been linked. The term "expression vector" includes any vector, (e.g., a plasmid, cosmid or phage chromosome) containing a gene construct in a form suitable for expression by a cell (e.g., linked to a transcriptional control element). "Plasmid" and "vector" are used interchangeably, as a plasmid is a commonly used form of vector. Moreover, the invention is intended to include other vectors which serve equivalent functions.

The term "operably linked to" refers to the functional relationship of a nucleic acid with another nucleic acid sequence. Promoters, enhancers, transcriptional and translational stop sites, and other signal sequences are examples of nucleic acid sequences that can operably linked to other sequences. For example, operable linkage of DNA to a transcriptional control element refers to the physical and functional relationship between the DNA and promoter such that the transcription of such DNA is initiated from the promoter by an RNA polymerase that specifically recognizes, binds to and transcribes the DNA.

DNA and RNA can be synthesized naturally (e.g. by DNA replication or transcription of DNA or RNA, respectively). DNA and RNA can also be chemically synthesized. RNA can be post-transcriptionally modified. The terms "target mRNA" and "target transcript," "target sequence" are synonymous as used herein.

REPRESENTATIVE EMBODIMENTS

This disclosure describes compositions of cationic polymers (e.g., diblock copolymers) which self-assemble in aqueous conditions to form polymer nanoparticles (PNPs). In illustrative embodiments, the PNPs can complex nucleic acids and deliver the complexed nucleic acids to a desired location. For example, the PNPs can deliver nucleic acids that encode antibodies (e.g., full length antibodies or fragments) so that the cell will produce the antibody.

In certain embodiments, a block copolymer comprises a first block and a second block. For example, the block copolymer may be a diblock copolymer. The first block may comprise a homopolymer of poly dimethylaminoethyl methacrylate (DMAEMA). The second block may comprise a homopolymer or a copolymer, such as a statistical copolymer. For example, the second block may comprise a homopolymer of poly-monomethyl methacrylate (MMA) or poly-vinyl methacrylate (VMA). Alternatively, the second block may comprise a copolymer of at least two of butyl-methacrylate (BMA), MAA, VMA, and N,N-diethylacrylamide (DEAAM).

In certain embodiments, a block copolymer comprises a first block homopolymer, wherein each monomer unit is represented by formula I:

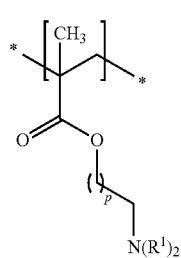

(I)

or a salt thereof, wherein:
p is 0 or an integer selected from 1-3,
each $R^1$ is individually selected from $C_1$-$C_6$ alkyl; and
wherein each * individually represents a point of covalent attachment to the rest of the block copolymer.

In certain embodiments, each $R^1$ is individually $C_1$-$C_3$ alkyl (e.g., methyl, propyl, isopropyl), and is preferably methyl.

In certain embodiments, the block copolymer comprises a second block homopolymer, wherein each monomer unit is represented by formula II:

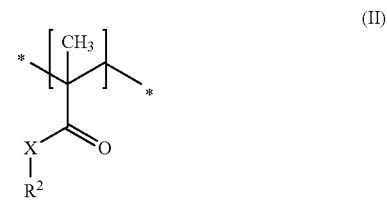

(II)

or a salt thereof, wherein:
X is —O— or —NR$^3$—;
$R^2$ is H, $C_1$-$C_6$ alkyl, or $C_2$-$C_6$ alkenyl, and
$R^3$ is $C_1$-$C_6$ alkyl;
wherein each * individually represents a point of covalent attachment to the rest of the block copolymer.

Alternatively, the block copolymer comprises a second block copolymer comprising a copolymer of two or more monomer units each individually represented by formula II:

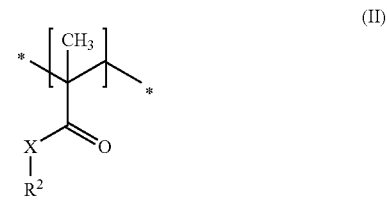

(II)

or a salt thereof, wherein:
X is —O— or —NR$^3$—;
$R^2$ is H, $C_1$-$C_6$ alkyl, or $C_2$-$C_6$ alkenyl, and
$R^3$ is $C_1$-$C_6$ alkyl;
wherein each * individually represents a point of covalent attachment to the rest of the block copolymer. For example the copolymer can be a statistical copolymer.

In certain embodiments, p is 0. Alternatively, p may be a value greater than 0, for example a value selected from 1-3, and is preferably 1.

In certain embodiments, the second block comprises a homopolymer of a monomer unit represented by formula II. In certain embodiments, the second block comprises a copolymer, for example a statistical copolymer, comprising a first monomer unit represented by formula II and a second monomer unit represented by formula II.

In certain embodiments, for example those where the second block comprises a homopolymer, X is —O—. Alternatively, X may be —NR$^3$—.

In certain embodiments, $R^2$ is $C_1$-$C_3$ alkyl, for example methyl. In certain embodiments where the second block comprises a homopolymer, $R^2$ is $C_1$-$C_3$ alkyl, and is preferably methyl. In certain embodiments, where the second block comprises a homopolymer, $C_2$-$C_6$ alkenyl, and is preferably $C_2$ alkenyl (e.g., vinyl).

In certain embodiments where the second block comprises a copolymer, $R^2$ is $C_1$-$C_6$ alkyl (e.g., ethyl or butyl) in a monomer unit, for example the first monomer unit, the second monomer unit, or a combination thereof. In certain embodiments, $R^2$ is H. In certain embodiments, $R^2$ is $C_2$-$C_6$ alkenyl, and is preferably $C_2$ alkenyl (e.g., vinyl).

In certain embodiments, for example those where the second block comprises a copolymer, X is —O—. Alternatively, X may be —$NR^3$—, where $R^3$ is $C_1$-$C_6$ alkyl, such as ethyl. In certain embodiments, X is —O— in one monomer unit and is —$NR^3$— (e.g., —N(ethyl)-) in a second monomer unit.

In some embodiments, the first block can be prepared from one or more monomer units and have a molecular weight ($M_w$) in the range of about 40 kDa to about 80 kDa.

In some embodiments, the second block can be prepared from one or more monomer units and have a molecular weight ($M_w$) in the range of about 5 kDa to about 75 kDa.

In some embodiments, block copolymers as prepared herein can be described by the following structure:

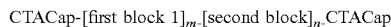

CTACap-[first block 1]$_m$-[second block]$_n$-CTACap where each CTACap is a capping unit derived from the chain transfer agent(s) used in the process for preparing the RAFT copolymer. The CTA used for preparing each of the first block and the second block can be the same or different. In some embodiments, the CTA used to prepare each the first block and the second block is the same (e.g., macroCTA). In some embodiments, the CTA used to prepare each of the first block and the second block is different. In some embodiments, the CTA used to prepare one or both of the first block and the second block comprises a functional group for the covalent attachment of a biomolecule, drug, or label to the block copolymer. In some embodiments, the covalent attachment can be via an ester or an amide bond. In some embodiments, the covalent attachment can be via EDC-NHS chemistry.

In some embodiments, the first block comprises a cap of formula:

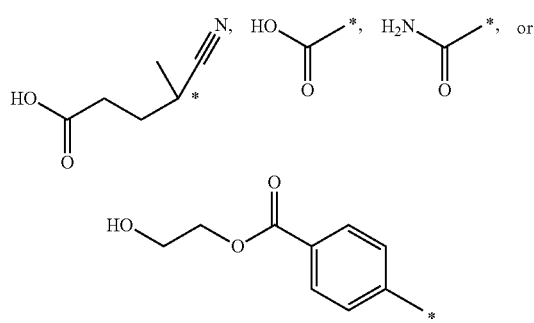

or a salt thereof, wherein * represents a point of covalent attachment to the first block. In certain preferred embodiments, the cap is

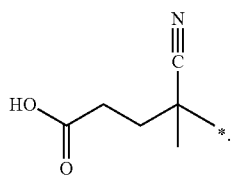

In some embodiments, the second capping unit is of formula

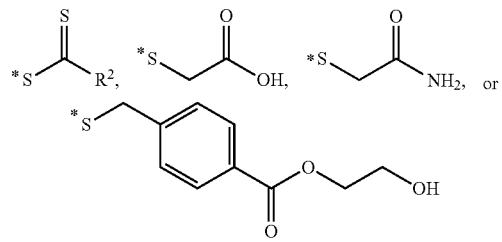

or a salt thereof, wherein * represents a point of covalent attachment to the second block, and $R^2$ is —$SC_2$-$C_{12}$ alkyl or $C_6H_5$, and is preferably

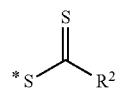

such as

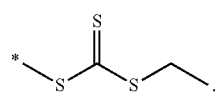

The block copolymer is preferably a diblock copolymer. In certain preferred embodiments, the block copolymer comprises poly dimethylaminoethyl methacrylate (DMAEMA) as the first block. The second block of the block copolymer comprises either (a) a homopolymer of polymethylmethacrylate (MMA) or polyvinylmethacrylate; (VMA) or (b) a copolymer of at least two of butylmethacrylate (BMA), methacrylic acid (MAA), VMA, and diethylaminoacrylamide (DEAAM).

In certain preferred embodiments that deliver nucleic acids that encode antibodies, the block copolymer comprises a first block that comprises DMAEMA. The second block preferably comprises a homopolymer of MMA or VMA, or alternatively comprises (i) a copolymer of BMA and MAA, VMA and BMA, or BMA and DEAAM.

In certain preferred embodiments, the first block comprises a homopolymer of DMAEMA, having a monomer structure of

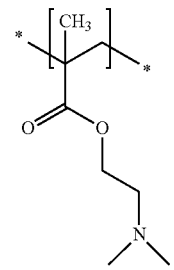

or a salt thereof, wherein each * individually represents a point of covalent attachment the connecting points to the rest of the block copolymer. The first block may have a molecular weight of at least about 20 kDa, at least about 25 kDa, or at least about 30 kDa. The first block may preferably have a molecular weight of at least about 35 kDa or at least about 40 kDa. For example, the first block may have a molecular weight of about 20 kDa to about 85 kDa, about 20 kDa to about 80 kDa, about 25 kDa to about 85 kDa, about 25 kDa to about 80 kDa, about 30 kDa to about 85 kDa, about 30 kDa to about 80 kDa, about 35 kDa to about 85 kDa, about 35 kDa to about 80 kDa, or about 40 kDa to about 80 kDa.

In certain embodiments, the second block comprises at least about 80 mol % MMA (e.g., about 80-100 mol %). In certain embodiments, the second block is a homopolymer that comprises MMA (i.e., is 100% MMA).

In certain embodiments, the first block is a homopolymer of DMAEMA and the second block is a homopolymer of MMA. The first block (e.g., a homopolymer of DMAEMA) may have a molecular weight of about 30 kDa to about 55 kDa and the second block (e.g., a homopolymer of MMA) may have a molecular weight of about 35 kDa to about 70 kDa or about 35 kDa to about 65 kDa. The first block (e.g., a homopolymer of DMAEMA) may have a molecular weight of about 30 kDa to about 55 kDa and the second block (e.g., a homopolymer of MMA) may have a molecular weight of about 2 kDa to about 20 kDa or about 2 kDa to about 10 kDa. In certain preferred embodiments, the second block comprises about 20 to about 80 mol % BMA. The second block may comprise about 30 to about 70 mol % BMA.

In certain embodiments, the second block is a copolymer that comprises about 20 to about 60 mol % MAA. In certain embodiments, if the second block is a copolymer that comprises MAA, the second monomer is BMA. For example, the first block may be a homopolymer of DMAEMA and the second block may be a copolymer of BMA (about 40 to about 80 mol %) and MAA (about 60 to about 20 mol %).

In certain preferred embodiments, the second block comprises at least 40 mol % VMA (e.g., 40-100 mol %). In certain preferred embodiments, the second block is a homopolymer that comprises VMA (i.e., is 100% VMA). The first block (e.g., a homopolymer of DMAEMA) may have a molecular weight of about 60 kDa to about 85 kDa and the second block (e.g., a homopolymer of VMA) may have a molecular weight of about 35 kDa to about 70 kDa, about 35 kDa to about 65 kDa, or about 30 kDa to about 50 kDa. For example, the second block (e.g., a homopolymer of VMA) may have a molecular weight of about 35 kDa, about 40 kDa, about 45 kDa, about 50 kDa, about 55 kDa, about 60 kDa, about 65 kDa, or about 70 kDa. The overall molecular weight of the polymer may be about 105 kDa to about 160 kDa or about 120 kDa to about 150 kDa. The corresponding PNP may have a diameter of about 100 nm to about 500 nm.

In certain preferred embodiments, the second block is a copolymer comprising about 40 to about 80 mol % VMA or about 50 to about 75 mol % VMA. Preferably, if the second block is a copolymer that comprises VMA, the second monomer is BMA. For example the second block may preferably contain a copolymer of VMA (40-80 mol %) and BMA (60-20 mol %). The first block (e.g., a homopolymer of DMAEMA) may have a molecular weight of about 40 kDa to about 70 kDa and the second block may have a molecular weight of about 65 kDa to about 90 kDa. The overall molecular weight of the polymer may be about 105 kDa to about 160 kDa or about 120 kDa to about 150 kDa. The corresponding PNP may have a diameter of about 500 nm to about 1000 nm.

In certain embodiments, the second block is a copolymer that comprises at about 40 to about 60 mol % DEAAM. Preferably, if the second block is a copolymer that comprises MAA, the second monomer is BMA.

In some embodiments, the polymer has an overall molecular weight (e.g., sum of the weight of the first block and the second block) that is about 30 kDa to about 150 kDa. For example, the overall molecular weight may be about 30 kDa, about 40 kDa, about 50 kDa, about 60 kDa, about 70 kDa, about 75 kDa, about 80 kDa, about 85 kDa, about 90 kDa, about 100 kDa, about 110 kDa, about 120 kDa, about 130 kDa, about 140 kDa, or about 150 kDa.

In some embodiments, a polymer nanoparticle comprises a block copolymer according to the present disclosure. In some embodiments, the block copolymer self-assembles into the nanoparticle.

In some embodiments, a diameter (e.g., a hydrodynamic diameter) of the nanoparticle is about 10 nm to about 2,000 nm, about 10 nm to about 1,000 nm, about 10 nm to about 100 nm, about 150 nm to about 500 nm, about 200 nm to about 500 nm, about 280 nm to about 390 nm, or about 300 nm to about 360 nm, as measured by DLS. In some embodiments, a diameter (e.g., a hydrodynamic diameter) of the nanoparticle is about 400 nm to about 950 nm, about 400 nm to about 900 nm, about 400 nm to about 850 nm, about 550 nm to about 850 nm, or about 650 nm to about 850 nm. In some embodiments, a diameter (e.g., a hydrodynamic diameter) of the nanoparticle is about 35 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, or about 1,000 nm.

In some embodiments, the nanoparticle comprises a barcode construct covalently attached to the nanoparticle, as described in U.S. Patent Application Publication No. 2022/033309, the entirety of which is hereby incorporated by reference. As described in U.S. Patent Application Publication No. 2022/033309, the presence of the barcode construct can allow for identification of PNPs of interest, for example by determining the presence of a PNP in particular tissue or by performance in an assay. It should be understood that although certain examples in this application are performed on PNPs that include the barcode, similar performance would be expected by PNPs that lack the barcode.

In some embodiments, a composition comprises a polymer nanoparticle as described herein and a nucleic acid (sometimes called a payload) complexed to the polymer nanoparticle. For example, the nucleic acid may be complexed to the nanoparticle through electrostatic interactions. In certain preferred embodiments, the polymer nanoparticle can serve as a transfection agent to deliver a nucleic acid to a cell.

In some embodiments, the nucleic acid is at least 5 kbp or at least about 10 kbp. In certain embodiments, the nucleic acid is about 10 kbp to about 15 kbp.

In certain embodiments, the plasmid is a bi-directional plasmid. In certain embodiments, the nucleic acids encode an antibody. For example, the PNPs deliver the antibody-encoding nucleic acids to cells and then the cells product, and may secrete, an antibody that corresponds to the delivered nucleic acid.

In certain embodiments, the antibody is secreted for about 2 days, about 6 days, about 9 days, or about 14 days post transfection. In certain embodiments, the secreted antibody is capable of neutralizing a pathogen, for example a virus such as SARS-Co-V-2

Illustrative antibodies include full length antibodies that include both the heavy and light chain of the antigen binding fragment (Fab) and the crystal fragment (Fc). In certain embodiments, the nucleic acid encodes an antigen binding fragment and a crystal fragment of an antibody.

The polymer nanoparticles described herein are capable of interacting with (e.g., encapsulating) nucleotide plasmids. In some embodiments, the encapsulation efficiency is greater than about 70%, greater than about 75%, greater than about 80%, greater than about 85%, greater than about 90%, greater than about 95%, or greater than about 97%.

In certain embodiments, the polymer nanoparticle and nucleic acid are present at a mass range of 30:1 to 60:1 (mass nanoparticle:mass nucleic acid).

In some embodiments, the polymer nanoparticles have low toxicity to cells. For example, in some embodiments, the cell viability after transfection of cells (e.g., neuronal cells such as Schwann cells) is at least about 70%, at least about 75%, at least about 80%, at least about 85%, at least about 90%, or at least about 95%.

The compositions described herein can be used for treating disease. For example, the polymer nanoparticles may be able to deliver a nucleic acid (i.e., a payload) that provides a therapeutic benefit to a patient. In certain embodiments, the polymer nanoparticle is able to deliver the nucleic acid to cells, for example somatic cells. In certain embodiments, the nucleic acids encode antibodies. Illustrative antibodies include full length antibodies that include both the heavy and light chain of the antigen binding fragment (Fab) and the crystal fragment (Fc). The nucleic acids delivered by the polymer nanoparticle may be useful in treating diseases that can be treated with an antibody.

In some embodiments a composition comprising a polymer nanoparticle (e.g., a polymer nanoparticle derived from a controlled living/radical polymerization process, such as RAFT polymer) associated with a nucleic acid construct is provided (sometimes called a polyplex). In another embodiment, a method of treating a patient with a disease is provided comprising administering to the patient the polyplex.

In some embodiments, a method of treating a patient with a disease is provided, comprising administering to the patient the polymer nanoparticle, wherein the polymer nanoparticle further comprises a drug payload, such as a polynucleotide or a protein payload, or a small molecule therapeutic or luminescent molecule payload, and treating the disease in the patient.

In certain embodiments, the polymer nanoparticles described herein can be used as a transfection agent to cells, for example somatic cells.

In various embodiments, any suitable route for administration of the library of polymer nanoparticles associated with nucleic acid constructs for the method of in vivo screening for the polymer nanoparticle associated with a nucleic acid construct, or for the method of treatment can be used including parenteral administration. Suitable routes for such parenteral administration include intravenous, intraarterial, intraperitoneal, intrathecal, epidural, intracerebroventricular, intraurethral, intrasternal, intracranial, intratumoral, intramuscular and subcutaneous delivery. In one embodiment, means for parenteral administration include needle (including microneedle) injectors, needle-free injectors and infusion techniques. In other embodiments, oral or pulmonary routes of administration can be used.

In various embodiments, payloads may be combined with the polymer nanoparticles compositions using any or all of covalent bonds, electrostatic interactions, and ligand affinity interactions. In one aspect, covalent bonding methods include the use of EDC/NHS to form stable amide bonds between the payload and the polymer nanoparticles for improved stability (both "on the shelf" and in vivo), case of separation and extraction, and sensitive detection. In another illustrative aspect, electrostatic bonding methods include the use of cationic polymer nanoparticles that electrostatically complex with the payload. In another embodiment, ligand affinity bonding includes the use of ligands such as avidin and biotin, both covalently bonded to the polymer nanoparticles and the payload via EDC/NHS chemistry to yield the stable combination of the payload and the polymer nanoparticles.

It will be appreciated that RAFT polymerization is generally known in the art. Suitable reagents, monomers, and conditions for RAFT polymerization previously investigated can be used in the copolymers, methods, and compositions described herein, such as those described in U.S. Pat. Nos. 9,006,193, 9,464,300, and 9,476,063, the disclosures of each of which are incorporated by reference in their entirety.

Chain transfer agents (CTAs) useful in connection with the present disclosure are known in the art. The identity of the CTA is not particularly limited. It will be appreciated that chain transfers steps that form the basis of RAFT polymerization involve a reversible transfer of a functional chain end-group (typically a thiocarbonylthio group, Z—C(=S) S—R) between chains and the propagating radicals. The overall process is comprised of the insertion of monomers between the R— and Z—C(=S)S— groups of a RAFT agent (CTA), which form the α and ω end-group of the majority of the resulting polymeric chains. Suitable CTAs for use in connection with the present disclosure include but are not limited to trithiocarbonates (Z=S-alkyl), dithiobenzoates (Z=Ph), dithiocarbamate (Z=N-alkyl), xanthates (Z=O-alkyl), and the like. (See, Sébastien Perrier, *Macromolecules* 2017 50 (19), 7433-7447). In some embodiments, RAFT copolymerization may be achieved using chain transfer agents (CTAs) containing one or more terminal carboxyl groups in order to obtain carboxy terminated polymers with ends available for bonding to the payload via the methods described above. In this embodiment, when the resulting mono or di-carboxy terminated polymer is dispersed in a low pH (e.g., a pH of less than 6) buffer, both ends of the polymer are exposed and available for labeling via EDC/NHS chemistry. In this embodiment, when the polymer is transferred to a physiological pH (~pH 7), the core blocks self-assemble, encapsulating the payload in the hydrophobic core, to be released and exposed upon acidification in the endosomal compartment of a cell. In some embodiments, the first or second chain transfer agent can be selected from the group consisting of bis(carboxymethyl)trithiocarbonate, bis (2-amino-2-oxoethyl) trithiocarbonate, bis[4-(2-hydroxyethoxycarbonyl)benzyl] trithiocarbonate, 4-cyano-4-(ethylsulfanylthiocarbonyl) sulfanylvpentanoic acid, 4-cyano-4-((phenylcarbonothioyl)thio)pentanoic acid, and 4-cyano-4-[(dodecylsulfanylthiocarbonyl)sulfanyl] pentanoic acid, 4-cyano-4-(thiobenzoylthio)pentanoic acid, 2-cyano-2-propyl benzodithioate, cyanomethyl methyl(phenyl)carbamodithioate, 2-cyano-2-propyl dodecyl trithiocarbonate, 2-(dodecylthiocarbonothioylthio)-2-methylpropionic acid, cyanomethyl dodecyl trithiocarbonate, 2-cyano-2-propyl 4-cyanobenzodithioate, and the like.

In some embodiments, the block copolymer can be associated with a DNA molecule, in particular a nucleic acid construct of the present disclosure, via several methods including, electrostatic interaction, high affinity, non-covalent bond, avidin-streptavidin conjugation, or by direct covalent attachment through, for example, an amide bond. In some embodiments, the RAFT copolymer can be associated with a DNA molecule, in particular a nucleic acid construct of the present disclosure, via electrostatic interaction complexed with a biological molecule. In some embodiments, the block copolymer can be associated with a DNA molecule, in particular a nucleic acid construct of the present disclosure, via electrostatic interaction complexed with a biological molecule. In some embodiments, the block copolymer can be associated with a DNA molecule, in particular a nucleic acid construct of the present disclosure, via a high affinity, non-covalent bond, avidin-streptavidin conjugation. In some embodiments, the block copolymer can be associated with a DNA molecule, in particular a nucleic acid construct of the present disclosure, by direct covalent attachment through, for example, an amide bond.

The polymer nanoparticles described herein can be associated with a nucleic acid construct of the present disclosure via electrostatic interaction, avidin-streptavidin conjugation, or by direct covalent attachment. Exemplary interactions include: polymer nanoparticle (PNP) with positively charged corona in the case of electrostatic loading; nucleic acid constructs with negative charges due to the phosphate groups; electrostatically loaded PNP-nucleic acid construct complexes; carboxylate group on the terminal end of the polymer chains in the corona of the PNP; primary amine group on the 5' end of the amine terminated nucleic acid construct; phosphate group on the 3' end of the nucleic acid construct; amide bond formed in the direct amidification reaction between the amine terminal nucleic acid construct and the carboxylate terminated PNP; primary amine on the biotin bonding protein such as avidin; amide bond formed between the carboxylate group on the terminal end of the polymer chains in the corona of the PNP and the primary amine on the biotin bonding protein such as avidin; nucleic acid construct with a biotin functional group on the 5' terminus; electrostatic coupling reaction that occurs when positively charged PNPs are mixed with negatively charged nucleic acid constructs; direct amidification reaction that is carried out via an EDA-NHC reaction between the carboxylate group on the terminal end of the polymer chains in the corona of the PNP and the primary amine on the amine terminated nucleic acid constructs; direct amidification reaction that is carried out via an EDA-NHC reaction between the carboxylate group on the terminal end of the polymer chains in the corona of the PNP and the primary amine on the biotin bonding protein such as avidin; coupling of the biotin on the 5' end of the nucleic acid construct and the avidin conjugated to the carboxylate terminus on the corona of the PNPs.

It will be appreciated that tuning the parameters and properties of the block copolymers described herein can be advantageous to their use in the compositions and methods as described herein. Accordingly, the methods for preparing block copolymers either in singleton or in library format as described herein are capable of providing particular parameters and properties of the block copolymers.

In some embodiments, a single chain transfer agent can be used in the RAFT polymerization process in connection with the present disclosure. In some embodiments, for a block polymer having more than one block, one or more single chain transfer agents can be used in the RAFT polymerization process in connection with the present disclosure. In some embodiments, for a block polymer having two blocks, a first chain transfer agent and a second chain transfer agent (which can be the same or different) can be used at each step of the RAFT polymerization process in connection with the present disclosure. In some embodiments, for a block polymer having three blocks, a first chain transfer agent, a second chain transfer agent, and a third chain transfer agent (which can be the same or different) can be used at each step of the RAFT polymerization process in connection with the present disclosure.

It will be appreciated that a variety of solvents can be used in the RAFT polymerization method steps and purification steps described herein. Suitable solvents include, but are not limited to, 2-Chloroethanol, Acetic Acid (Glacial), Acetone, Acetonitrile, Acetophenone, Aniline, Benzaldehyde, Benzyl Acetate, Carbon disulfide, Cyclohexane, Cyclohexanol, Di(ethylene glycol), Di(propylene glycol), Diacetone alcohol, Diethyl ether, Dimethylsulfoxide, Ethanol, Ethyl acetate, Ethylene glycol, Formaldehyde (37% solution), Formamide, Formic acid, Formic acid (96%), HexaneIsobutanol, Isopropanol, Isopropyl acetate, Isopropyl ether, m-Cresol, Methanol, Methyl acetate, Methyl ethyl ketone, Mineral Oil, N,N-Dimethylformamide, n-Butanol, n-Octane, n-Propanol, Propylene glycol, Pyridine, t-Butanol, Tetrahydrofuran, Trifluoroacetic acid, water, and the like, and combinations thereof.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

EXAMPLES

Example 1

Polymer Nanoparticle Synthesis and Characterization

A diblock copolymer was synthesized as described in US2022/0175812, the entirety of which is incorporated by reference herein, using reversible addition-fragmentation chain transfer (RAFT) polymerization with reagents and amounts listed in Table 1. Block 1 reagents were combined in a round bottom flask, purged with argon, and heated to 60° C. for 6 hours using a heating mantle. The reaction product was purified using four 80:20 pentane:ether precipitation washes and centrifugation cycles and dried in vacuo. The Block 1 product was used as the macroRAFT agent for Block 2, and the calculated reagent volumes (as calculated based on theoretical molecular weight information for Block 1) were combined in a round bottom for the Block 2 reaction. The reaction mixture was argon purged before being heated at 60° C. for 24 hours. The reaction product was purified using the same purification process and dried in vacuo. The resulting polymer was dialyzed in deionized water for 4 days with multiple water changes each day. Finally, the dialyzed material was lyophilized for 4 days and stored at room temperature for experimental use. The polymer compositions are shown in Table 2.

TABLE 1

Reagents and amounts used to synthesize barcoded PNPs

| Reagent | Purpose | Lot 0001 Amount | Lot 0002 Amount |
|---|---|---|---|
| Block 1 | | | |
| 2-dimethylaminoethyl acrylate (DMAEMA) | Monomer | 15999.6 mg | 32000.0 mg |
| (4-cyano-4-(((ethylthio)carbonothioyl)thio) pentanoicacid) (ECT) | Chain transfer agent | 76.9 mg | 153.7 mg |
| Azobisisobutyronitrile (AIBN) | Initiator | 9.5 mg | 19.05 mg |
| Dimethylformamide (DMF) | Solvent | 24131.1 mg | 48229.8 mg |
| Block 1 Reaction Yield | % Yield | 31.75% | 39.55% |
| Block 2 | | | |
| 2-dimethylaminoethyl acrylate (DMAEMA) | Monomer | 713.0 mg | 2110.6 mg |
| butyl methacrylate (BMA) | Monomer | 1934.4 mg | 5727.6 mg |
| propyl acrylic acid (PAA) | Monomer | 518.2 mg | 1540.1 mg |
| Block 1 macroRAFT agent, meaning ECT + DMAEMA. The ECT end groups (R & Z) were still present to perform their function, but they were on the end of the p(DMAEMA) polymer synthesized as block 1. For reference, here is ECT showing the R & Z groups on either side of the trithiocarbonyl group. | Macro Chain transfer agent | 1528.4 mg | 4526.2 mg |
| Azobisisobutyronitrile (AIBN) | Initiator | 1.7 mg | 4.93 mg |
| Dimethylformamide (DMF) | Solvent | 7045.0 mg | 20828.8 mg |
| Block 2 Reaction Yield | % Yield | 73.33% | 70.99% |

TABLE 2

Polymer Compositions

| ID | Block 2 Monomer 1 | Mol % Monomer 1 in Block 2 | Block 2 Monomer 2 | Mol % Monomer 2 in Block 2 |
|---|---|---|---|---|
| 1 | MMA | 100.0 | NA | NA |
| 2 | BMA | 60.0 | MAA | 40.0 |
| 3 | VMA | 100.0 | NA | NA |
| 4 | VMA | 100.0 | NA | NA |
| 5 | VMA | 59.9 | BMA | 40.1 |
| 6 | BMA | 60.1 | DEAAM | 39.9 |

Procedure for DNA Barcode Conjugation

DNA barcodes were conjugated to the polymer nanoparticles using carbodiimide coupling of a primary amine in the DNA barcode to a carboxylic acid of the chain transfer agent to produce an amide bond between the DNA and the polymer nanoparticle. In an acid buffer with a pH of ~4.5, such as 4-morpholinoethanesulfonic acid (hereinafter referred to as MES), the polymer nanoparticles were dispersed. To this dispersion was added 1-ethyl-3-(-3-dimethylaminopropyl) carbodiimide (hereinafter referred to as EDC), and N-hydroxysuccinimide (hereinafter referred to as NHS), both in a molar excess to the diblock copolymer, with the resulting product being the formation of an NHS ester with the polymer. The pH of this dispersion was then raised to about 7.4 by exchanging the buffer with phosphate buffered saline. At pH 7.4, the NHS ester was then reacted with a primary amine terminated DNA barcode to form an amide bond between the barode and the polymer nanoparticle. Unconjugated DNA barcodes were removed by filtration through a membrane with a molecular weight cut-off of about 30 kDa.

Procedure for Particle Size Measurement Using Dynamic Light Scattering

The polymer molecular weights of the block 1 polymers were determined by GPC. Results are shown in Table 3. The theoretical diblock copolymer molecular weight was determined using the ratio of monomer, initiator, and block 1 macro chain transfer agent, as is common in reversible addition-fragmentation chain transfer polymerization. The theoretical block 2 molecular weight was simply the difference between the theoretical diblock copolymer molecular weight and the block 1 molecular weight.

TABLE 3

Polymer weights

| ID | Block 1 Mw (kDa) | Block 2 Mw (kDa) | Theoretical diblock Mw (kDa) |
|---|---|---|---|
| 1 | 44.7 | 4.99 | 49.7 |
| 2 | 68.4 | 7.18 | 75.6 |
| 3 | 76.3 | 44.75 | 121.1 |
| 4 | 76.3 | 67.04 | 143.4 |
| 5 | 58.3 | 74.46 | 132.8 |
| 6 | 43.4 | 41.25 | 84.6 |

Procedure for Particle Size Measurement Using Dynamic Light Scattering:

Di-block polymers in a dry solid state were rehydrated using ultrapure water or suitable aqueous buffer to a concentration in the range of about 1-40 mg/mL, utilizing a combination of agitation by orbital shaker and sonication to disperse the polymer into nanoparticles. Solutions were centrifuged for 5 minutes to settle any dust or large aggregates present. Aliquots were transferred to a flat-bottom well plate suitable for measurement and diluted tenfold, resulting in a polymer concentration in the range of about 0.1-4 mg/mL. The plate was measured using a Wyatt DynaPro Plate Reader III utilizing 7 acquisitions per well. Suitable data filters were applied to the resulting autocorrelation functions to remove low-quality acquisitions. Representative data filter parameters include a baseline acceptance criterion of 1±0.05, a minimum amplitude of 0.05, and a maximum sum-of-squares error of 100. The Z-average diameter was used to provide the hydrodynamic diameter. Results are shown in Table 4.

TABLE 4

PNP size

| ID | PNP Diameter (nm) |
|---|---|
| 1 | 116.6 |
| 2 | 37.0 |
| 3 | 326.1 |
| 4 | 441.6 |
| 5 | 846.6 |
| 6 | 408.6 |

Example 2

The six PNPs used in this study were chosen from a DNA barcode screen in which unique DNA barcodes were attached to each PNP. The PNPs were pooled together in a test article with 1000 PNPs in total and administered to a mouse via IV injection. The lung tissue was harvested (among other tissues) and the barcodes were counted via PCR and NGS. The barcode counts for the six PNPs are shown to the right, and these counts were statistically greater than the average barcode counts in the lung tissue ($p<0.05$). The results are shown in FIG. 1.

The invention claimed is:

1. A block copolymer comprising a first block and a second block, wherein
   (i) the first block comprises poly-2-(dimethylamino)ethyl methacrylate (DMAEMA); and
   (ii) the second block comprises a copolymer of butylmethacrylate (BMA) and vinylmethacrylate (VMA).

2. A polymer nanoparticle comprising:
   a block copolymer according claim 1,
   wherein the nanoparticle has a hydrodynamic diameter of about 10 nm to about 1000 nm.

3. The polymer nanoparticle of claim 2, wherein the nanoparticle has a hydrodynamic diameter of about 10 nm to about 500 nm.

4. A composition comprising:
   a polymer nanoparticle according to claim 2, and
   a nucleic acid complexed to the polymer nanoparticle.

5. The composition of claim 4, wherein the nucleic acid encodes an antibody.

6. A method of treating a disease in a patient in need thereof, the method comprising:
   administering a therapeutically effective amount of a composition according to claim 4.

7. The block copolymer of claim 1, wherein the second block comprises about 20 to about 80 mol % BMA.

8. The block copolymer of claim 1, wherein the first block homopolymer has a molecular weight of at least about 20,000 Da.

* * * * *